(12) United States Patent
Knox

(10) Patent No.: US 12,423,396 B2
(45) Date of Patent: Sep. 23, 2025

(54) VALIDATING LIVE HUMANS AND VERIFYING ENGAGEMENT ACTIVITY IN VIRTUAL SETTINGS

(71) Applicant: Gregory Knox, Los Angeles, CA (US)

(72) Inventor: Gregory Knox, Los Angeles, CA (US)

( * ) Notice: Subject to any disclaimer, the term of this patent is extended or adjusted under 35 U.S.C. 154(b) by 0 days.

(21) Appl. No.: 18/240,331

(22) Filed: Aug. 30, 2023

(65) Prior Publication Data
US 2025/0077634 A1   Mar. 6, 2025

(51) Int. Cl.
*G06F 21/32*   (2013.01)
*G06F 21/31*   (2013.01)

(52) U.S. Cl.
CPC ............ *G06F 21/32* (2013.01); *G06F 21/316* (2013.01)

(58) Field of Classification Search
CPC ............................... G06F 21/32; G06F 21/316
See application file for complete search history.

(56) References Cited

U.S. PATENT DOCUMENTS

| | | | | |
|---|---|---|---|---|
| 8,769,556 B2 * | 7/2014 | Guo | ........................ | H04H 60/45 725/12 |
| 9,894,415 B2 * | 2/2018 | Knox | ............... | H04N 21/44218 |
| 2007/0124756 A1 * | 5/2007 | Covell | ................... | G06F 16/635 348/E7.071 |
| 2007/0157247 A1 * | 7/2007 | Cordray | ................. | G06Q 30/02 348/E5.006 |
| 2007/0271580 A1 * | 11/2007 | Tischer | .................. | H04H 60/07 725/35 |

* cited by examiner

*Primary Examiner* — Michael B. Pierorazio

(57) ABSTRACT

The present disclosure relates generally to computer-implemented systems and techniques for leveraging a virtual decentralized database to enable user identity authentication and verification of user activity and associated behaviors on open internet and public web-based and native applications. Techniques are disclosed for user identification profile onboarding using biometrics, frictionless CAPTCHA (Completely Automatic Public Turing Tests To Tell Humans And Computers Apart) processes, passive data capture of physiological and behaviors using device sensors, and cryptographic methods of storing user engagement activity as immutable data files for secure distribution on a decentralized virtual private network. Such technologies operate to establish a high confidence level for user authenticity, communication origin, engagement outcome transparency and clarity of intent for users active on social, commercial, e-commerce and information sharing platforms. More specifically, an unobtrusive passive data capture method of authentication and verification on a secure VPN supports the organic, spontaneous and original experience audiences desire while simultaneously eliminating opportunities for unscrupulous actors to exploit open internet exchanges by inserting fraudulent user accounts, automated bots and other measures that mimic or impersonate live humans, which ultimately undermines user confidence in data safety and erodes mutual trust between people, companies and institutions.

1 Claim, 14 Drawing Sheets

340

Sensors — 342

Depth Sensing Camera
Image Proximity/Range
Flood Illuminator
Infrared LED
Infrared Camera
Dot Projector
Fingerprint
Accelerometer
Gyroscope
Altimeter
GPS
Ambient Light Level
Electrocardiogram (ECG)
Electromyogram (EMG)
Electrodermal (EDA)
Pulse Oximeters
Blood Pressure (BP)
Respirometer
Ultrasonic 3D
Force

Modalities — 344

Facial Features
Eye Movement/Gaze
Eyebrow Movement
Cheek Movement
Lip/Mouth Movement
Head Movements
Physical Movements
Voice/Speech Sounds
Body Temperature
Pulse/Heart Rate
Perspiration
Oxygen Level
Respiration Rate

Behaviors — 346

Expressions
Emotions
Eye Tracking
Head Position
Body Position
Human Gestures
Facial Recognition
Object Recognition
Distance Travelled
Sleep Quality
Environment

Engagement Factors — 348

Human Authentication
Identity Verification
Attention
Distraction
Emotion
Affinity
Intensity
Frustration
Confusion
Disgust
Comprehension
Environment
Frequency
Patterns
Aggregation
Audience

FIGURE 3B

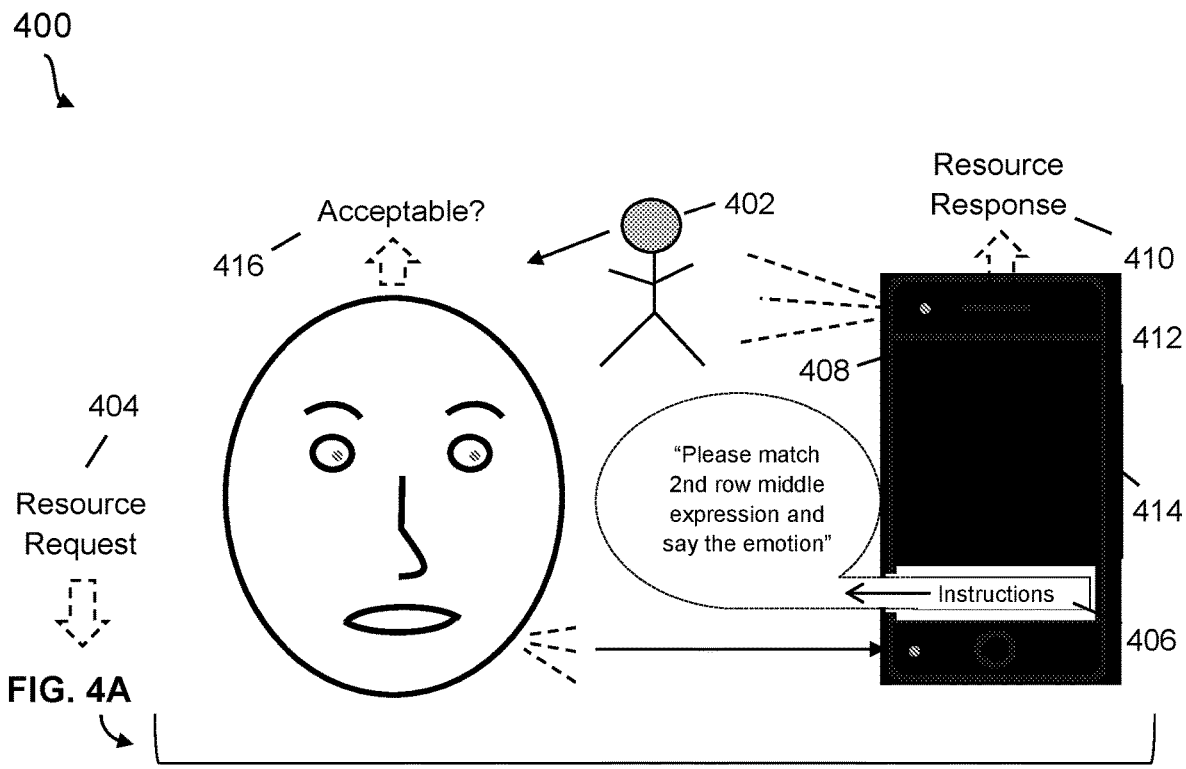

FIG. 4A

FIG. 4B
1) "Please mimic the emoji expressions presented on screen."
2) "Please display expressions according to the descriptions of expressions presented on screen."

FIG. 4C
1) "Please mimic the expressions within the image cluster that change color."
2) "Please mimic the expressions within the image cluster that are located at corners of the array, in clockwise pattern."
3) "Please mimic the expressions within the image cluster that are located in the top row, from left to right."

FIG. 4D
1) "Please present your hand symbol credentials."
2) "Please present your face gesture credentials."
3) "Please present you image credentials."

800

Dashboard

| Ingestion | Integration | Storage | Security | Cryptography | Processing | Data Science | Reporting |
|---|---|---|---|---|---|---|---|
| Cloud | Enterprise Data | Repositories | Encryption | Node Network | Device | AI/ML Modeling | Embedded |
| Web/Hybrid | Mobile | Hybrid Cloud | VPN | Blockchain | KPIs | Language | Enterprise |
| Native App | Execution | Legacy Data | Blockchain | Currency/Token | Data Mining | Streaming | Filters |
| Edge Device | Web Services | Data Warehouse | Authority | Private/Public | OLAP | Supply Path Audit | Ad hoc |
| Cryptography | Enrichment | Data Marts | Identity Management | Encryption | Metrics | Graphs | Mobile |
| Standardization | API/SDK | | Alerts | | | Descriptive | Production |
| | ERP/CRM | | | | | Predictive | Operational |
| | OLAP | | | | | Prescriptive | Query |
| | | | | | | | Self Service |

Campaign Builder — 820

| FEATURE | Media type | Category | Filter Mix | Available Audience | Solicited Audience | Budget | Cost | Deploy |
|---|---|---|---|---|---|---|---|---|
| PLAN | Video | Product | 18-30y male-mixed | Total: 1200 | Selected: 940 | Total $10,000 Allocation Split% 75/25 | Total | Mixed Wide 48 Hours |
| OPTIONS | Stream Music Image Sound Slogan Logo | Brand Service Social Premium 501(C3) Gov. | Age Gender Race Language Location Behaviors Sensors | By: Age Gender Race Language Location | By: Age Gender Race Language Location | Currency Ecommerce Incentive Attributes | Spend Per User vs. Avg. | Local Regional National Zip code Device |

FIGURE 8B

Reports — 822

| FEATURE | Profile status | Pending Solicitations | Favorite | Time | Payments | Payout Lists |
|---|---|---|---|---|---|---|
| MODE | Active Campaign: Social | Publisher #11 Publisher #4 | Publisher #20 Publisher #27 | Daily Minutes/ Pay Rate Per Minute | Overall Total | Incentives And Rewards |
| OPTIONS | Dormant Exclusive Social Only | Engagement Pay History Demo Match Reputation Brand Associates Language | Find Match Send Demo Solicitations Rewards Programs | Week/Month Per Publisher Category Demographic | By: Publisher Category Demographics | By: Demographics User Group Category Publisher Campaign Rewards Games |

FIGURE 8C

VALIDATING LIVE HUMANS AND VERIFYING ENGAGEMENT ACTIVITY IN VIRTUAL SETTINGS

CROSS-REFERENCE TO RELATED APPLICATIONS

This non-provisional application claims the benefit of priority to provisional application No. 63/402,474 filed on Aug. 31, 2022, which is a continuation of application Ser. No. 16/930,171, filed on Jul. 15, 2020, now U.S. Pat. No. 11,481,652 which claims the benefit of priority to provisional application No. 62/874,506, filed Jul. 16, 2019, which is a continuation of application Ser. No. 15/843,859, filed on Dec. 15, 2017, which is a continuation of application Ser. No. 15/188,997, filed on Jun. 22, 2016, now U.S. Pat. No. 9,984,415, which claims the benefit of priority to provisional application No. 62/183,605, filed Jun. 23, 2015. All of these applications are incorporated by reference herein in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD

The present application relates generally to the field of user identity authentication, validation and user behavior verification, specifically to improved methods of validating user identities and verification of user activities using biometric analysis and data cryptography techniques.

REFERENCES CITED

U.S. Patent Documents

U.S. Pat. No. 6,301,370 B1 October 2001 Steffens et al.
US 2009/0113294 A1 April 2009 Sanghavi et al.
U.S. Pat. No. 7,929,805 B2 April 2011 Wang et al.
U.S. Pat. No. 8,769,641 B2 July 2014 Griffin
U.S. Pat. No. 8,988,350 B2 March 2015 Karmarkar et al.
U.S. Pat. No. 9,166,974 B2 October 2015 Shuster
US 2016/0191505 A1 July 2016 Frank
U.S. Pat. No. 9,558,337 B2 January 2017 Gross
U.S. Pat. No. 9,600,651 B1 March 2017 Ryan et al.
U.S. Pat. No. 9,690,915 B2 June 2017 Turgeman et al.
U.S. Pat. No. 9,723,005 B1 August 2017 McInerny et al.
U.S. Pat. No. 9,792,742 B2 October 2017 Johnson et al.
U.S. Pat. No. 9,870,461 B2 January 2018 Akula et al.
U.S. Pat. No. 9,912,657 B2 March 2018 Dasgupta et al.
U.S. Pat. No. 10,331,945 B2 July 2019 Piccolotto et al.

Foreign Patent Documents

WO 2015/004598 A1 January 2015
WO 2017/0111601 January 2017
WO 2017/025573 A1 February 2017
WO 2018/226265 A1 December 2018
WO 2019/143896 A3 July 2019
WO 2019/200264 A1 October 2019
WO 2020/060606 A1 March 2020
CN 111897435A August 2020

Other Publications

"Facebook's New Captcha Test: 'Upload A Clear Photo of Your Face'," www.wired.com, November 2017
"Facebook's New Captcha Test: 'Upload A Clear Photo of Your Face'," Nitasha Tiku, www.wired.com, November 2017
"What You Need to Know about Face ID on the iphone X," www.itworxonline.com December 2017
"More than one billion smartphones to feature facial recognition in 2020," Pavel Naiya, www.counterpointresearch.com, February 2018
"rtCaptcha: A Real-Time CAPTCHA Based Liveness Detection System," Erkam Uzun, et al., Georgia Institute of Technology, www.ndss-symposium.org, February 2018
"A Monstrous Apple Patent on all-things Face ID Surfaced in Europe this week with both Face & Touch ID on the same iPhone," www.patentlyapple.com, Jack Purcher December 2018
"Three iPhone X Patents were Published Today Covering the Notch, it's 'Vision System' and Wireless Charging," www.patentlyapple.com, February 2019
"Huawei Mate 20 Pro update lets users add a second face for face unlock," www.xda-developers.com, February 2019
"Facebook is testing a face detection tool to verify your identity," Jon Fingas, www.engadget.com, November 2019
"Should You Use Your Face to Unlock Your Phone?," Wams, Inc., www.wamsinc.com February 2020
"'What the hell's an NFT?'—'SNL' explains in an amazing rap parody," www.marketwatch.com, March 2021

BACKGROUND

Access to information, services, entertainment and social platforms over public internet-enabled networks compels the need for greater security measures to counter threats to general data safety, identity theft or misappropriation, damage to brand reputation and overall economic loss when personal or corporate data is compromised or corrupted. At the crux of the issue is the tension created by the user's desire for access to public platforms compared with the user's ability to preserve and protect individual privacy in a situational or case-by-case basis. Often platforms provide user data privacy controls that are broad and overreaching, where granting device access permission creates exposures to unwanted privacy threats. The perceived risk of loss and misuse of private data has a major influence on a user's motivation and decision to potentially expose their private data to profile online forums, where bad actors make similar calculations of exploiting technical vulnerabilities and audience assumptions about data safe environments. One key challenge is a balance between threat barriers deployed and resulting quality of the user experience. Consequences for a data breach is high for the average user whom relies on the host platform to safeguard account information including user identity, financial information, user device data, device sensor access, contact lists and the like.

Measurement tools for identifying and tracking user activity online are well documented. These days, many smart devices are equipped with Face ID and other biometric measurement technologies that create unique identifiers sufficient for touch-less login operations that execute complex algorithms with very low error rates. And, while third-party cookie usage has diminished, variations on scraping, fingerprinting, automated bots and other user identification and behavior measuring technologies will continue to grow as online lifestyles expand, albeit largely outside the scope of awareness for the average user. A comprehensive solution includes unobtrusive methods of establishing high confidence levels for an individual's identity and verification of behavioral activity associated with user accounts, along with efficient encryption and decryption of private data shared between mutual parties.

Publicly available internet enabled technologies require varying degrees of security layers according to the user experience design, data usage and/or security requirements of necessitated by the type of user activities and nature of the data stored by a platform. In some aspects, the burden of authenticity falls on the host entity, where many businesses are obligated to create identity standards and data security protocols to comply with anti-money laundering and Know Your Customer regulations. In other aspects, users seek to shield themselves from identity thieves, fraudsters and other predators by adopting and acclimating to elevated standards such as two-factor authentication for user accounts and various CAPTCHA (Completely Automatic Public Turing Tests To Tell Humans And Computers Apart) utilities to confirm they are a human, and not a robot. As societies become more reliant on internet resources, the "arms race" between security threats and security solutions will continue, especially as machine learning and artificial intelligence introduce new schemes for developers on both sides, such as "deepfake" technologies that digitally alter faces, bodies and voices. Given this inevitable dynamic between competing interests, a novel approach is needed in order to leverage barriers to entry for computer-implemented methods of impersonating a human, mimicking human behaviors and fraudulently misrepresenting online activity to unsuspecting social users, digital brands and third-party data consumers.

SUMMARY

The present innovation combines identification, authentication and verification solutions using passive data capture modalities in one system within a distributed virtual private network (VPN) with cryptographic techniques to provide a more trustworthy, reliable and scalable user engagement solution for online public forums and native applications, delivering many advantages over the prior art. In some embodiments, a distributed access, validation and verification (DAV) system, performs key processes on edge clients to preserve data privacy while encrypting usable information for distribution by various host machine nodes and remote clients operating system applications. In some embodiments, a DAV system operates applications on virtual machine or cloud server applications for computing and networking resources, including a VPN gateway with cryptographic protocols and cyphers for public and private keys, algorithmically encoded server Transport Layer Security (TLS) handshakes, and hash function protocols for authentication and validation of data. In some embodiments, a DAV system operates a frictionless identity management system. Using biometric and non-biometric data with multi-factor authentication modalities, a frictionless identification process provides greater efficiency and accuracy for onboarding users and real-time verification of humans associated with user accounts. Cryptographic techniques for data verification such as blockchain increases trust and confidence between users of the system. In some embodiments, a DAV system operates a frictionless user authentication system. Multi-factor biometric modalities incorporated into browsers for open web traffic and native applications for subscribers enable seamless interactions with authentication applications that are less disruptive and more convenient than haptic interface methods. A frictionless CAPTCHA process using biometric signals more efficiently delivers authentication of both human status, using techniques that reduce human input errors along with confirmation that the individual delivering the unique signal data is the originating user assigned to the account of record. In some embodiments, a DAV system operates a user activity verification and validation system. User behavior and activity tracking and customer resolution often are delivered by separate and often disjointed processes in open web and some native applications, where platform operators deploy third-party software to collect and assemble data stores from unique code on devices containing user demographics, platform activity, browsing, content interactions, advertising and marketing data, purchase behaviors, and the like. A frictionless activity verification and validation system incorporates identity authentication with device enabled tracking data to provide higher trust and confidence of reported data based on its association with biometrically validated and verified users. The innovations described herein create greater fluidity in identifying and measuring deeper user experiences on public forums while simultaneously providing greater security and confidence in data integrity generated by authentic humans. This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The present invention is illustrated by the accompanying drawings to provide examples of possible features, structures and operations for the disclosed subject matter, and not by way of limitation to any changes in form and detail that may be made by one skilled in the art within the spirit and scope of the disclosed implementations.

FIG. 3B shows an exemplary set of DAV module datasets.

FIG. 4A, FIG. 4B, FIG. 4C, and FIG. 4D are illustrations of methods for deploying non-physical or frictionless identity management (FIM) resources.

FIG. 8A, FIG. 8B and FIG. 8C are screen shot illustrations of an exemplary dashboard overview of software used to manage data, information and communications on an engagement intelligence marketplace exchange.

DETAILED DESCRIPTION

Figure 1:
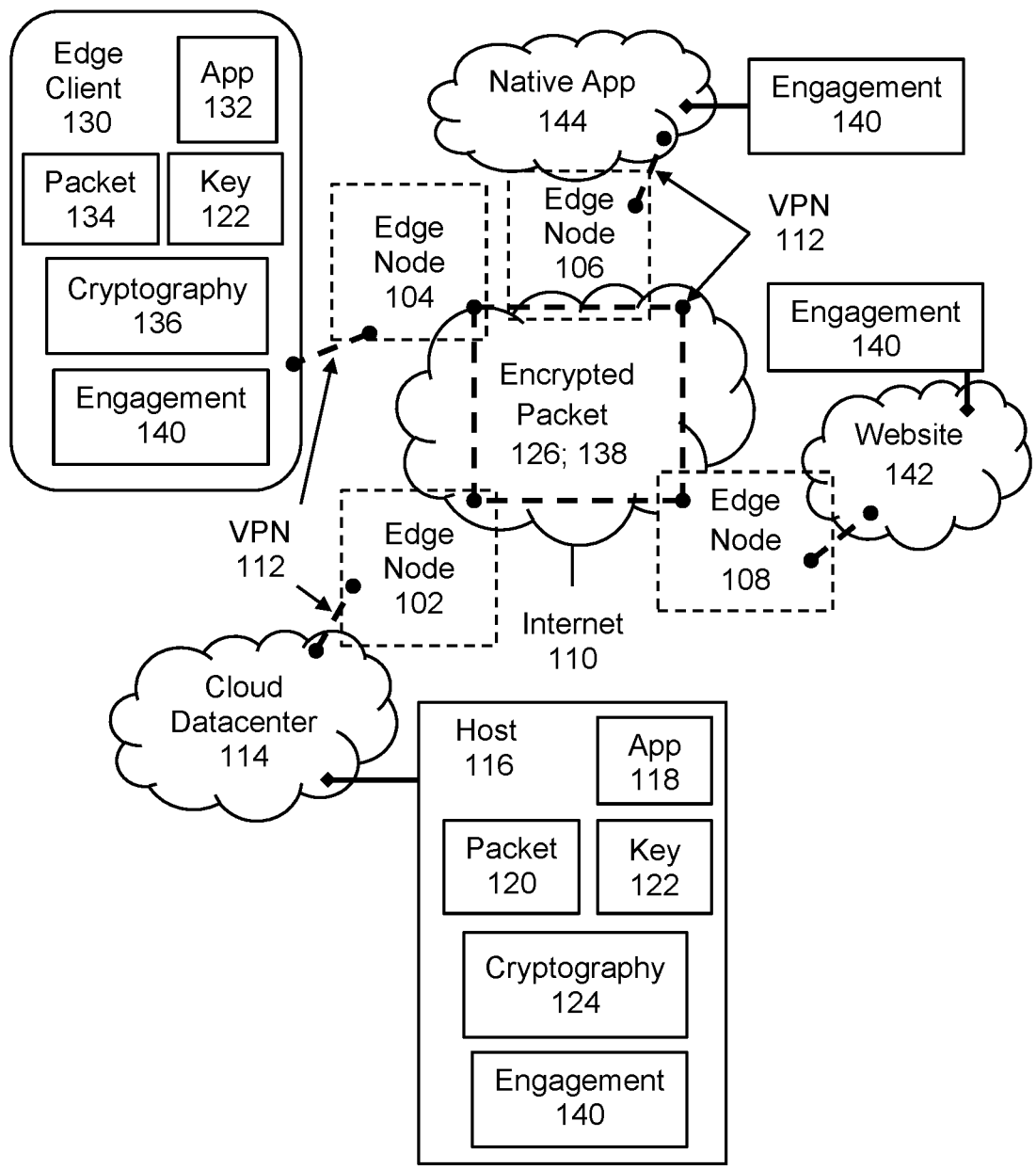
FIG. 1 is a diagram of a multi-layered distributed architecture or edge computing infrastructure for remote user identification, authentication, and verification.

Systems and methods, in accordance with various examples of the disclosure and accompanying drawing, may address one or more of the aforementioned deficiencies experienced in establishing a virtual marketplace for media audience measurement feedback data. As such, the aspects presented are not intended to limit the scope of the innovation or claims described herein. In fact, the descriptions of the invention are presented with specific detail to provide a clear understanding of the subject matter such that modifications or equivalents are deemed to be within the spirit and scope of the disclosure, but without limitations that require all details to be applicable to practicing one or more aspects depicted herein. Generally, a distributed access, validation and verification (DAV) system serves several different purposes. First, a cryptographic identity management system utilizing biometric markers operating on an edge devices provides security from external threats to identity theft. For example, many new techniques for facial ID system utilize dot projectors that generate upwards of 30,000 data points that create a unique signature with error rates close to 1 in 1 million. Identity validation on device, coupled with a decentralized VPN, creates even higher barriers for identity thieves to overcome. Second, a user authentication system using frictionless CAPTCHA (Completely Automatic Public Turing Tests To Tell Humans And Computers Apart) techniques is more likely to be adopted by mobile device users. Mobile users may find haptic controls for most CAPTCHA products cumbersome and difficult to use, which results in access to portals being declined, a frustrated user experience, and loss of user interaction data for the application host. Third, an immutable data solution for tracking user behaviors is beneficial to both consumers, content publishers and the platforms (particularly advertising based) that rely on user and consumer traffic to justify ad placement rates. Creating permanent record of user behaviors creates engagement efficiencies by informing participants of preferences and tastes that they then may use to leverage engagement rewards and premiums from interested content publishers and platform hosts. Platforms and publishers otherwise could have obtained similar consumer clarity and depth of understanding only by paying third-party services that track, sort, collate, analyze and associate device data, IP addresses, user ID names, and the like. This innovation also creates new schemes for consumers creating digital assets out of their own unique online experiences and preferences.

The present invention discloses several components, processes, data configurations, algorithmic techniques, and cryptographic methods that may be implemented using various operating systems, program languages, neural network architectures, application programming interface (API) functions, database server systems, computer programs, cloud computing architectures, mobile computing architectures and/or general purpose machines such that anyone skilled in the art can practice the innovations described herein.

Referring to FIG. 1, the present invention discloses a computer-implemented system for a multi-layered distributed architecture or edge computing infrastructure 100 (hereinafter "edge network") to provide virtual private network services that facilitate external access to internal resources. In some embodiments, edge network 100 composition may vary based on the availability and costs of public, private or hybrid cloud solutions in accordance with performance, security and scalability requirements. Generally, edge network 100 is comprised of software, computing hardware and network resources that are organized as a network of "internal" nodes 102-108 that are accessible with "external" client computing software (hereinafter "edge client") 130 using various cryptographic and security applications. In some aspects, edge network 100 nodes 102-108 are established by computing devices that comprise at least one or more cloud datacenter 114, from which host machines 116 operate cloud-based software programs or virtual machines to run distributed network applications. In other aspects, edge network 100 facilitates communications and access to resources between one or more devices operating edge client 130 and one or more host machine 116, and host machine 116 with other host machines 116 using a plurality of edge nodes 102-108 that interface with internet 110 data traffic software and security protocols. In some other aspects, host machine 116 is node 102-108. In some other aspects, edge nodes 102-108 host resources such as secure gateway or virtual private network (VPN) 112 services whereby external devices operating edge client 130 can access host machine 116 applications and resources. In some embodiments, cloud datacenter 114 is a centralized or regional data center providing cloud related operations and functions to support and facilitate computation, data storage and network resources between cloud datacenter 114 and other edge network 100 components including edge nodes 102-108, edge client 130, website 142 and native application 144.

FIG. 1 represents an edge network 100 infrastructure that is comprised of at least one cloud datacenter 114. In some embodiments, a plurality of cloud datacenter 114 is connected in edge network 100 with edge node 102-108 configurations for specific virtual machine and/or computing resources, applications, and services available to external devices operating edge client 130. In other embodiments, cloud datacenter 114 is comprised of one or more host machines 116. In some embodiments, host machines 116 are comprised of hardware and software components including but not limited to central processing unit (CPU) microprocessors, low-power neural coprocessors, graphics processors, ROM, RAM, and flash memory storage for performing tasks such as operating software, reading instructions stored on a non-transitory machine-readable memory, communication connections on various network types including the Internet, Ethernet, Local Area Network (LAN), Wide Area Network (WAN), Wireless Fidelity (Wi-Fi), Microwave Access (Wi-Max), Code Division Multiple Access (CDMA), Global System for Mobile communications (GSM), mobile 5G, fiber optic, and the like. In some aspects, host machine 116 operates at least one application 118 that produces at least one data packet 120 for use by system 100 components. In some embodiments, data packet 120 is a unit of data in a particular format or structure that is used to transmit information between edge network 100 components. In other embodiments, host machine 116 provides network, data storage, cloud network operation and computation resources to edge network 100. In some aspects, host machine 116 may manage workflow, workload failover, scalability, public and private cloud collaboration, hierarchical topology and other elastically-accessed resources available in cloud based architectures. In some other aspects, host machine 116 operates at least one application 118 that produces at least one data or network packet 120 for use by the system 100.

Figure 3A:
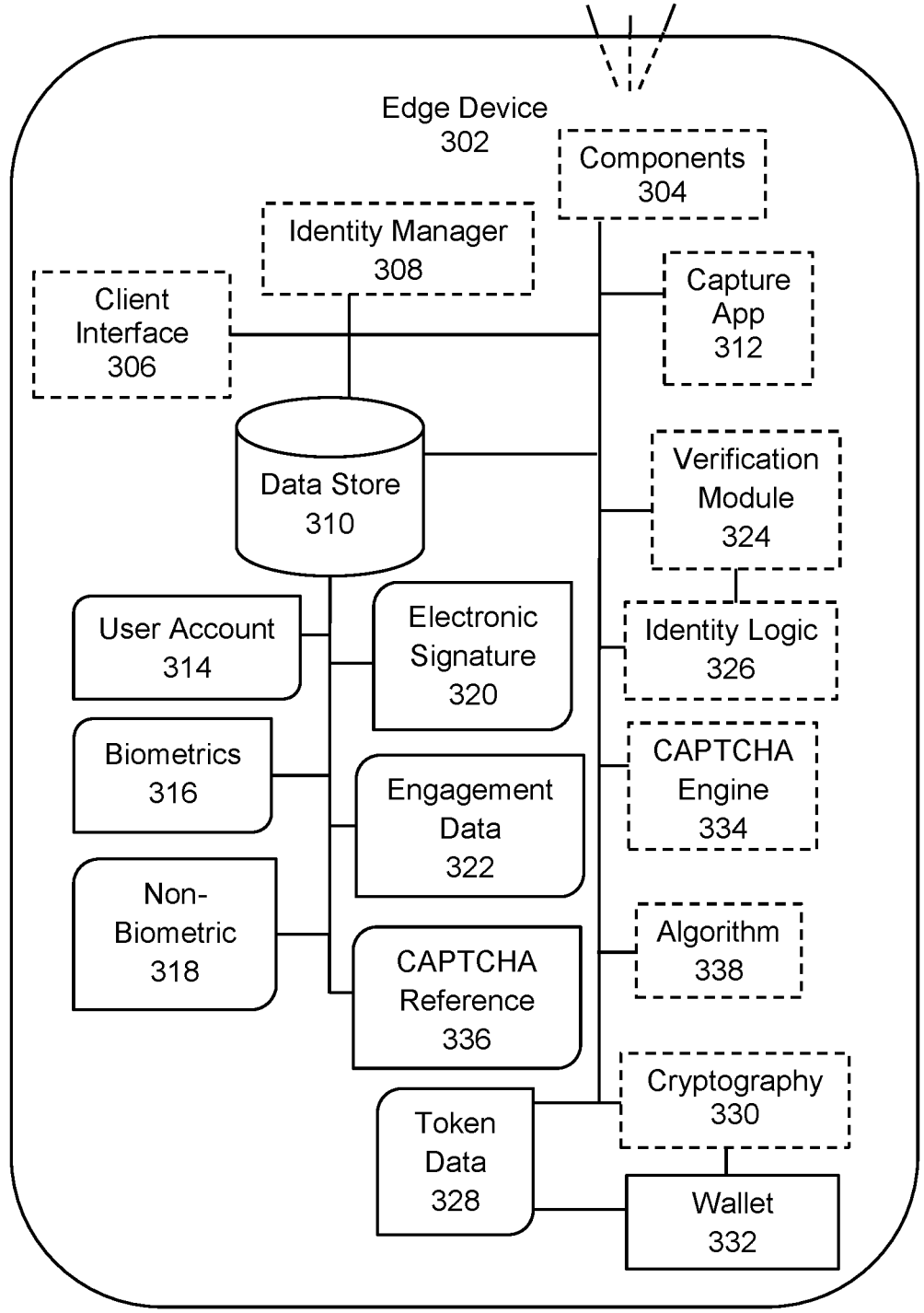
FIG. 3A is a block diagram of an exemplary DAV client software.

In some embodiments, external devices operating edge client 130 software components are configured for a variety of operations on a computing device, such as edge device 302 described in FIG. 3A. In some aspects, devices operating edge client 130 software operations include, but are not limited to, operating microprocessors, low-power neural coprocessors, vision processing units, graphics processors, ROM, RAM, and flash memory storage for performing tasks such as web browsing, downloads, audio video playback, computer vision applications, facial identification, machine learning, reading instructions stored on a non-transitory machine-readable memory, and communication connections on various network types including the Internet, Ethernet, Local Area Network (LAN), Wide Area Network (WAN), Wireless Fidelity (Wi-Fi), Microwave Access (Wi-Max), Code Division Multiple Access (CDMA), Global System for Mobile communications (GSM), mobile 5G, fiber optic, and the like. In some embodiments, edge client 130 operates at least one application 132 that produces at least one data packet 134 for use by the system 100.

In some embodiments, edge network 100 includes encryption and decryption applications and techniques, such as cryptography program 124, that utilize a cryptographic key 122. In some aspects, host machine 116 operates cryptography program 124 and utilize key 122 to encrypt and decrypt one or more data packet 120 sent to and delivered from VPN 112. In other aspects, edge client 130 operates cryptography program 136 and utilize key 122 to encrypt and decrypt one or more data packet 134 sent to and delivered from VPN 112. In one example, cryptography program 124, operating on host machine 116, may encrypt data packet 120 using encryption key 122, creating encrypted packet 126 for use by system 100. In another example, edge client 130 creates a data packet 134 using application 132 where cryptography program 136 may encrypt data packet 134 using encryption key 122, creating encrypted packet 138 for use by system 100. In an instance of the present example depicting edge client 130 and cloud datacenter 114 transmissions, application 132 generates packet 134 which cryptography program 136 and key 122 applications process into encrypted packet 138 that is forwarded on VPN 112 connection via internet 110 to edge node 102 which negotiates key 122 encryption and forwards the information to host 116 that cryptography program 124 and key 122 applications decrypt encrypted packet 138 into packet 120 using cryptography program 124, enabling packet 120 use by application 118. In some embodiments, nodes 102-108 comprise a blockchain system where each has a consensus protocol and blockchain ledger to prove and authentic blockchain data code or smart contracts 508. In some examples, blockchain data or blockchain ledger is comprised of data packet 120, 126, 134 and/or 138. In some aspects, nodes 102-108 are coupled with cryptography program 124, 136 to operate a cryptographic hash algorithm to generate block hash and facilitate a Digital Asset Modeling Language to establish smart contract applications, workflows and ledger application program interfaces or DAML and DAML Ledger APIs. In some aspects, nodes 102-108 may be comprised in one or more configurations including public, private and consortium architectures.

As represented in FIG. 1, in some embodiments edge network 100, including host 116 and edge client 130, operates one or more engagement software program 140 that is integrated or configured to function and interface with website 142 and native application 144. In some aspects, engagement software program 140 is coupled or connected to website 142 and native application 144 using software programming of a specific nature, or a combination therein, such as Python, Java, JavaScript, C++, HyperText Markup Language (HTML) as well as commercially available platforms designed for integrating marketing data, consumer insights, business intelligence, and the like. In other aspects, engagement software program 140 is integrated or configured for operation with all edge network 100 components including edge nodes 102-108 cloud datacenter 114, edge client 130, website 142 and native application 144. In some embodiments, engagement software program 140 includes identity management, user validation and activity verification software programs as depicted in FIGS. 3A-D. In other embodiments, engagement software program 140 includes frictionless identity validation and verification processes as described in FIG. 4. In further embodiments, engagement software program 140 includes a cryptographic token management system for capturing and management user engagement activity and related information as described in FIG. 5.

Figure 2:
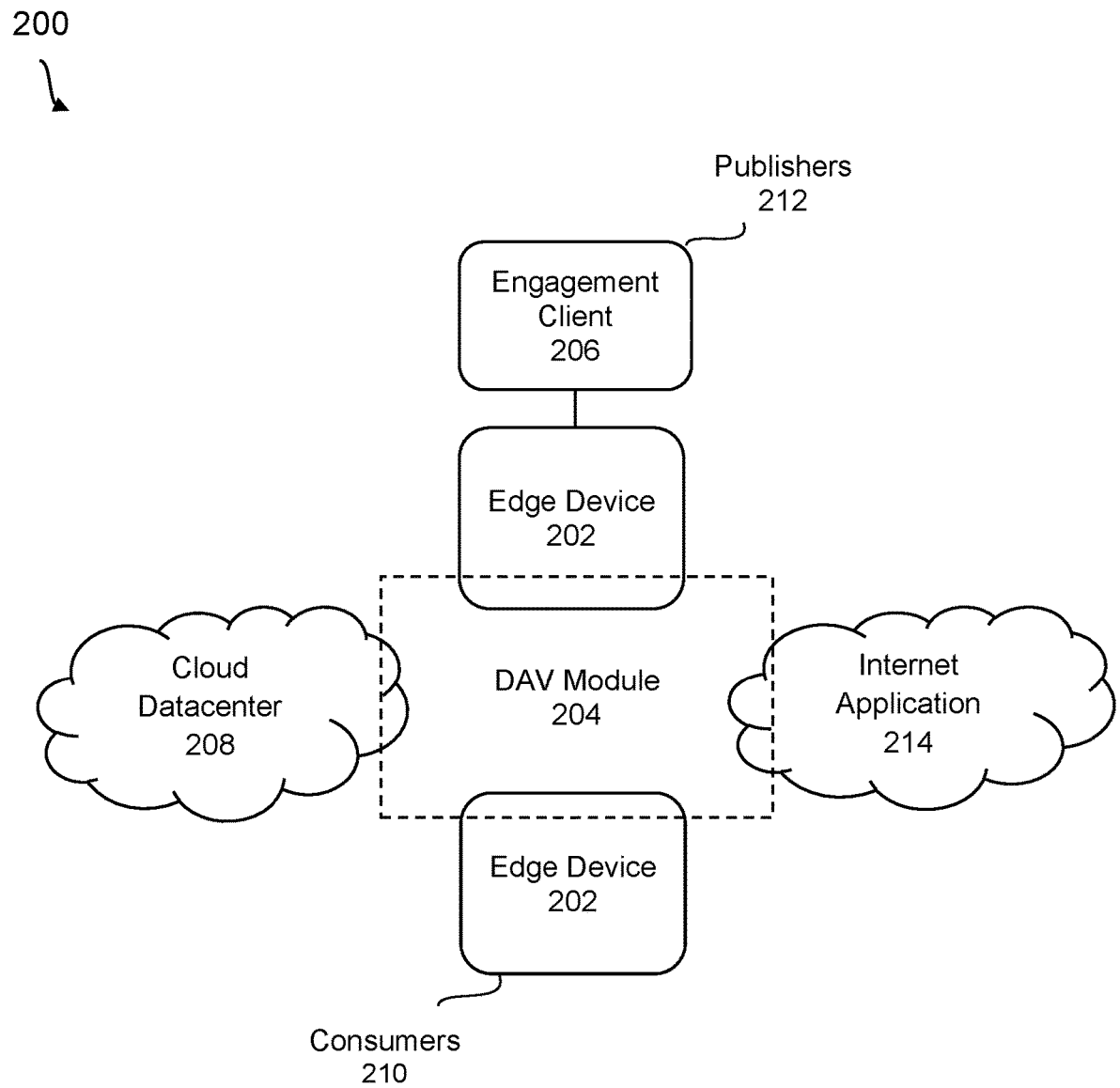
FIG. 2 is a diagram of an exemplary distributed access, validation and verification (DAV) system.

FIG. 2 shows a high level diagram illustrating a computer-implemented network for a distributed access, validation and verification (DAV) system. Generally, DAV network 200 is a computerized implementation of multiple services using hardware and software components including identity verification and management, in addition to user activity and behavior verification. In some aspects, this multi-faceted approach facilitates greater transparency, security and trust between consumers 210 and publishers 212, providing higher relationship confidence and promotion of continued and higher volumes of engagement. In some embodiments, DAV network 200 includes at least one edge device 202, DAV module 204, engagement client 206, cloud datacenter 208, consumer 210 and publisher 212. In some embodiments, DAV network 200 is edge network 100. In some aspects, internet applications 214 represents a plurality of internet enabled websites 142 and native applications 144 that facilitate interactions, communications and data exchanges between consumers 210 and publishers 212. For purposes of clarity, internet applications 214 enable "interactions" for subjects 402 described in FIGS. 4A-D and/or engagement events 514 described in and FIG. 5. that range from electronic advertisements, multimedia content in streaming or download forms, surveys and interactive applications such as AR/VR, 3D, virtual games, creating artwork, video conferencing, personalized and social content, image and video sharing, and the like. In some embodiments, edge device 202 is a hardware device including electronic components and software capable of operating edge client 130. In other embodiments, edge device 202 is edge device 302, as detailed further in FIG. 3A. In some other embodiments, edge device 202 configurations may include a variety of computing systems such as cell phones, personal digital assistants (PDAs), computer tablets, smart phones, touch screen devices, desktop computers, portable laptop computers, networked multimedia appliances, hand-held devices, internet enabled gaming systems, microprocessor-based systems, programmable consumer electronics, multiprocessor systems, smart TVs, TV set-top boxes, video game consoles, computer servers, distributed computing environments, internet enabled watches, internet enabled wearable devices, internet enabled security systems, internet enabled transportation (cars, buses, trains, boats, planes). In some aspects, edge device 202 may be used by at least one user of DAV network 200 (consumer 210, publisher 212) to access, communicate, send and receive data with DAV network 200 components, including other edge devices 202.

Generally, DAV module 204 establishes an electronic or virtual environment that resolves challenges to establishing trust and confidence between consumers 210 and publishers 212. Presumably, greater confidence and trust will promote greater reliance and/or dependability for favorable online experiences. For the purposes of clarity, the term "publisher" may refer to an individual, business, web service or automated software process that delivers or presents multimedia content online (websites and native applications) including images, photos, video, text and the like, while "consumers" may refer to participants that access online platforms for various lifestyle, entertainment, business and social experiences. In some embodiments, DAV module 204 is engagement software 140. In some embodiments, DAV module 204 includes software systems for identity verification, identity management and activity management that operate primarily in a "frictionless" capacity so as to not hinder or frustrate user experiences for either consumers 210 or publishers 212 seeking and experiencing online interactions on mutual terms. In some aspects, DAV module 204 is a software-as-a-service (SaaS) program that operates as a component of DAV network 200 on edge network 100. In other aspects, DAV module 204 is a microservice 620 architecture operating on DAV network 200 components with modular and distributed services including, but not limited to, identity management, distributed VPN applications, user engagement analysis, and cryptographic applications, as described further in FIG. 6. In other embodiments, DAV module 204 is a multi-layered software system that facilitates interactions or engagement events 514 between consumers 210 and publishers 212. In some aspects, DAV module 204 embodiments may be configured and/or integrated into connected multi-media devices as web applications, networked media appliance applications, smart TV applications, mobile applications, desktop software and designed to be used on certain displays (e.g., mobile phones, tablet computers, smart televisions, and other network connected computing devices). In other aspects, DAV module 204 may operate as a single standalone software application or be comprised of an integrated set of software programs. In one example, DAV module 204 facilitates software operations such as facial analysis and other non-haptic processes to create an encrypted biometric signature of users for unobtrusive identity verification and management in order to reduce errors experienced, particularly by mobile users, while attempting to confirm login credentials or account ownership using manual inputs on portable devices, as detailed further in FIG. 3. In another example, DAV module 204 facilitates software operations that capture and convert human biometric and physiological signals of a subject 402 into data used for unobtrusive CAPTCHA (Completely Automatic Public Turing Tests To Tell Humans And Computers Apart) applications, such as, such facial feature recognition, expression detection, emotion detection, gesture detection, speech recognition, and/or voice commands, as detailed further in FIG. 4. In a further example, DAV module 204 facilitates software operations such as capturing off-device behaviors during online interactions such as expressions, emotions, eye tracking and gestures in unique sequences, different combinations and random patterns to ensure collected response information is from the account holder of record, greatly reducing risks of human mimicking and fraudulent applications from misrepresenting the account holder to third-parties, as detailed further in FIG. 4. In still further examples, DAV module 204 facilitates software operations such as cryptographic encryption techniques to encrypt and encode data generated by consumer 210 and publisher 212 on DAV network 200 including personal data stored on edge device 202 and engagement data delivered on a secure VPN, as detailed further in FIG. 5. In some embodiments, engagement client 206 is a software system that facilitates interactions, such as or engagement events 514, between consumers 210 and publishers 212, as detailed further in FIGS. 5-8. In some aspects, engagement client 206 is a software-as-a-service (SaaS) program that operates as a component of DAV network 200. In other aspects, engagement client 206 is configured to manage data input and output to and from users (consumer 210 and publisher 212) and network 200 components. In some other aspects, engagement client 206 is configured to manage data input and output from sources external to network 200 including but not limited to third-party software integrations, data management, data storage, machine learning and artificial intelligence, encryption, e-commerce, media server, ad exchange platforms, distributed network protocols and the like, as described in FIG. 7 and FIG. 8. In some embodiments, datacenter 208 is cloud datacenter 114. In some aspects, datacenter 208 manages cloud-based DAV network 200 computing resources including hardware and software for processors, data storage, communications, cryptography, distributed network applications, and the like. In some embodiments, internet applications 214 are comprised of source code, computer program languages, API's and SDK's software applications, and/or network communications protocols that connect DAV module 204 to online platforms, as detailed further in FIGS. 6-8.

FIG. 3A represents a detailed block diagram of an exemplary DAV client 300 and a conceptual overview of an identity management, user authentication and engagement activity verification system. For the purposes of describing the innovations of the present innovation, the technical and descriptive representations in FIG. 3 are merely exemplary and not intended to unduly limit the claimed embodiments of the present invention. One of ordinary skill in the art would recognize many possible variations, alternatives, and modifications for techniques and methods for reducing to practicing certain components or combinations of the proposed technology. In some embodiments, DAV client 300 is engagement software 140. In some aspects, DAV client 300 is software operated on edge device 302, a networked multifunctional smart device. In some embodiments, edge device 302 is edge device 202. In some other embodiments, edge device 302 is a networked multifunctional smart device such as mobile phone, tablet, laptop, desktop computer, networked multimedia appliance or similar apparatus. In some aspects, edge device 302 includes software and hardware components 304 for operating networked multimedia and multifunctional smart devices including, but not limited to, camera and image sensors (optical, infrared, depth perception, dot projector, flood illuminator, vector generation), lights, user interface screens, GPS, accelerometer, gyroscope, biometric scanners, displays, CPU processors, sensors, I/O devices, graphics processors, memory (ROM, RAM, cache, and non-volatile), storage (data, audio, images, video), and communication connections on various network types including the Internet, Ethernet, Local Area Network (LAN), Wide Area Network (WAN), Wireless Fidelity (Wi-Fi), Microwave Access (Wi-Max), Code Division Multiple Access (CDMA), Global System for Mobile communications (GSM), mobile 5G, fiber optic, and the like. In some aspects, components 304 comprise software and hardware for operating and executing DAV client 300 applications and processes as a DAV network 200 microservice on edge device 302 including, but not limited to, client interface 306, identity manager 308, capture application 312, verification module 324, identity logic 326, cryptography application 330, CAPTCHA engine 334, and algorithm 338.

In some embodiments, DAV client 300 processes, applications, sub-processes and/or sub-applications may be coupled to data store 310 and components 304 including edge device 302 processor, circuitry and resources capable of executing instructions and functions of DAV client 300 software applications, controls, functions and sub-processes. In some aspects, DAV client 300 operating software may execute applications for data collection, labeling, organization, encoding, analysis and storage of edge device 302 operation data, DAV network 200 data, and associated user account 314 data. In some other aspects, data store 310 may store DAV client 300 and DAV network 200 related data resources for CPU processors, graphics processors, applications, hardware and software controls, and the like in various formats, file systems, memory caches, relational databases including, but not limited to, such as, but not MySql, Oracle, Sybase, or DB2. In some embodiments, data store 310 may store data for various DAV client 300 applications including but not limited to personal, private, and electronic account information as user account data 314 related identity management, activity verification, and reference information such as biometric 316, non-biometric 318 data, electronic signature data 320, engagement data 322 and CAPTCHA reference data 336, as depicted in FIG. 3B. In some embodiments, DAV client 300 includes client interface 306. In some aspects, client interface 306 manages edge device 302 connections to DAV network 200 components including security protocols, cryptography, communications, data transfers and the like. In other aspects, client interface 306 operates host machine and node application functions in a decentralized network, as described previously in FIG. 1. In some other aspects, client interface 306 includes user controls such as a device screen haptic control interface for managing user accounts, DAV client 300 software applications and information on an engagement intelligence marketplace exchange platform, as described in FIG. 6 and FIG. 7. In some embodiments, DAV client 300 includes identity manager 308. In some aspects, identity manager 308 is coupled to edge device 302 applications and specific components 304 according to process and operation requirements for identity management, identity validation, and engagement activity verification according to the inventions described herein. In other aspects, identity manager 308 is coupled to capture application 312 and components 304 to facilitate DAV client 300 user controls, collect DAV module 204 user and system inputs such as biometric 316, non-biometric 318 information, electronic signature 320, engagement data 322 and CAPTCHA reference data 336. In some other aspects, identity manager 308 may use the aforementioned user, component and system data inputs collectively or independently to establish data to confirm user identity and verify engagement activity for use by DAV client 300 and DAV network 200. In some aspects, capture application 312 provides instructions and commands the allow DAV client 300 software to integrate with edge device 302. In some examples, capture application 312 integrates DAV client 300 with edge device 302 software and operating systems such as, but not limited to, Android, Microsoft Windows, Windows Mobile OS, Mac OS X, IOS, Linux, Symbian, webOS, SmartCast and/or Tizen.

In some embodiments, DAV client 300 includes verification module 324. In some aspects, verification module 324 coupled to capture application 312 utilizes components 304 to perform biometric 316 and non-biometric 318 data capture processes, as detailed further in FIG. 3C, FIG. 3D and FIG. 4. In other aspects, verification module 324 processes may be executed by algorithm 338 including, but not limited to, face detection, expression detection, emotion recognition, expression and eye tracking calibration, voice analysis, voice command recognition, natural language processing, gesture recognition, retinal scanning, fingerprint scanning, image recognition and object recognition. In some embodiments, algorithm program 338 is a set of or sequence of computer-implementable instructions that may be executed to perform a task, a calculation, create a random number sequence, determine a probability, interpret data inputs, compare attributes, and the like. In some aspects, face and expression detection, emotion and object recognition processes executed by algorithm program 338 may be coupled to and/or automatically deploy certain components 304 such as a flood infrared illumination sensor in a dot light array for depth detection coupled to a camera and image signal processor to produce or estimate a three-dimensional map of the subject's face for use by verification module 324 to establish or confirm a user's identity. In some other aspects, algorithm program 338 may execute two-step verification process using one or more biometric 316 and non-biometric 318 data inputs to confirm a user's identity, such as voice recognition and retinal scan.

In some embodiments, verification module 324 may be coupled to identity logic 326. In some aspects, identity logic 326 processes operate selection, arrangement, presentation order, type, categories of data accessed by verification module 324. In some aspects, identity logic 326 provides verification module 324 access to DAV network 200 resources based on the type of DAV client 300 operation or resource requested. In some examples, identity logic 326 operations include, but are not limited to, facial detection reference data, cloud-based algorithm and machine learning analytics for facial recognition and expression analysis, user authentication instructions, authentication analysis sequences, random number generators, encryption keys for encryption and decryption processes, CAPTCHA, and the like. In other aspects, identity logic 326 communicates data, software updates, authentication protocols, encryption key information and other program information with DAV network 200 components including, but not limited to, DAV module 204, engagement client 206, cloud datacenter 208, and internet application 214.

In some embodiments, verification module 324 may use algorithm 338 to execute a calibration program to calibrate a subject's facial features, facial expressions, eye movement and tracking with edge device 302 components 304 to obtain optimal results from respective DAV client 300 processes and sub-processes including, but not limited to, mapping facial features, landscape, sizes, colors, textures, contours, and dimensions and the like. In other embodiments, verification module 324 may be coupled to identity logic 326 and algorithm 388 to execute optimal calibration techniques with more accurate data inputs. In some other embodiments, verification module 324 may execute facial detection processes with sufficient resolution such that multiple digital images of a subject's face are electronically mapped and converted to an electronic signature 320 for use by DAV client 300 user identification and verification processes. In still other embodiments, verification module 324 may execute algorithm 338 software enabled biometric detection and data conversion processes such as face analysis, fingerprint scanning, retinal scanning, voice analysis, and electroencephalogram (EEG) signals to generate biometric 316 data and/or electronic signature 320 data files. In some aspects, electronic signature 320 may be used to identify a human subject 402. In other aspects, electronic signature may be used to identify a human subject 402 associated with user account 314 as detailed further in FIG. 3D. In still other embodiments, verification module 324 may execute algorithm 338 object detection processes with sufficient resolution such that digital images of an object or group of objects may be electronically mapped and converted to non-biometric 318 data and electronic signature 320 data information. In some aspects, "objects" may include physical durable goods, photos, tattoos in addition to human gestures, including hand movements, symbols, sign language and the like, that are captured in an order, sequence or cluster such that a unique image set, combination or pattern is created and stored as non-biometric data 318 and/or electronic signature 320 for uses as described above. In some aspects, biometric 318 and non-biometric 318 data is processed, configured and modified in various electronic signature 320 formats for use by DAV client 300 and DAV network 200 components including, but not limited to, program language, network protocols, cryptography, metadata labeling, data language, file size, encoding, and the like. In some embodiments, verification module 324 generates a unique reference code used to identify specific user account 314 information stored as electronic signature 320 for use by DAV network 200 components. In other embodiments, verification module 324, coupled to algorithm 338 and/or cryptography application 330, generates an encrypted unique reference code used to identify specific user account 314 information stored as electronic signature 320 for use by DAV network 200 components. In some examples, electronic signature 320 reference code may represent a combination of biometric 318 and non-biometric data 318, including but not limited to, a subject presenting specific user account 314 data such as a distinct voice phrase or pattern stored as audio data, and a video capture of a specific personal object a previously stored on edge device 302. An illustration of the present example may begin with a DAV module 204 login prompt requesting the user to verify the original personal information used to create the original electronic signature 320 for comparative analysis, such as speaking the unique audio phrase and using a device camera to scan a unique personal object or multiple objects in a unique configuration.

In some embodiments, DAV client 300 applications, including but not limited to identity manager 308 and verification module 324, may execute an encryption and decryption process using cryptography application 330 to encrypt and decrypt electronic signature 320, as well as other DAV client 300 and DAV network 200 generated data, stored in digital asset wallet 332. In some aspects, cryptography application 330 is operated on a node connected to a decentralized network that facilitates secure VPN access to cryptography program (124, 136) as described in FIG. 1. In other aspects, cryptography application 330 may encode electronic signature 320 with reference data associating a subject 402 with user account 314, and stores the reference data in data store 310 for use by related DAV client 300 and DAV network 200 processes.

In some embodiments, DAV client 300 includes CAPTCHA engine 334. In other embodiments, CAPTCHA engine 334 is coupled to DAV client 300, edge device 302 and DAV network 200 software and hardware resources required to perform identity management and user validation processes on edge device 302 as described herein. Generally, in some other embodiments, CAPTCHA engine 334 resources, including CAPTCHA reference data 336, may be deployed to validate and/or verify the human status and identity of a user account 314 holder in real-time before, during and after generating user engagement data 322 as result of automated or computer generated inputs from DAV network 200, DAV module 204, DAV client 300 and/or user initiated edge device 302 interaction inputs with internet application 214, referred to as engagement events 514 in FIG. 5. In other aspects, CAPTCHA engine 334 communicates via client interface 306 with DAV network 200 components, each of which may initiate a CAPTCHA engine 334 resource request 372 and receive a subsequent response 388 as part of process steps shown in FIG. 3D. In some embodiments, edge device 302 and DAV network 200 components may transmit and receive CAPTCHA resource request 372 and response 388 data communications via client interface 306 using source code instructions, data, and/or markup language including, but not limited to, JavaScript, JSON, XML data, Hypertext Markup Language ("HTML'), extensible hypertext markup language (XHTML) data, JavaScript Object Notation (JSON) data, JSON with padding (JSONP) and/or some combination thereof. For clarity, DAV network 200 components may include specific operations and functions or security protocols that require a CAPTCHA resource such as, but not limited to, a web portal login sequence, a web page login, a native mobile application login application, a security verification application, an identity verification process, a web administrator, a programmatic advertising or media server, a cloud database, and other networked agents and the like. Also for clarity, a "resource" may refer to user authentication, validation and verification programs deployed on edge device 302 and managed by CAPTCHA engine 334 to facilitate, for example, user validation or verification resources including, but not limited to, 1) verifying that a human is the current operator of edge device 302, 2) confirming the identity of the current edge device 302 user with the recorded user account 314 holder, and 3) verifying the current operator of device 302 is the human associated with electronic signature 320, engagement data 322 and/or CAPTCHA reference data 336 on record.

In some embodiments CAPTCHA engine 334 may configure and store CAPTCHA reference data 336 for use by the engine's identity management and user validation processes. Generally, CAPTCHA reference data 336 is a data and information resource used by CAPTCHA engine 334 for presentation challenges to a subject such that only human cognition could interpret, respond correctly and/or accurately react to the information provided. In some aspects, CAPTCHA reference data 336 is stored in data store 310 then sorted, labeled, categorized, formatted, and configured by CAPTCHA engine 334 according to the identity validation and verification process executed by CAPTCHA engine 334. In some examples, CAPTCHA reference data 336 may one or more images, photos, videos, alphanumeric texts, audio files, symbols, biometric 316 information, non-biometric 318 information, and the like. In some aspects, CAPTCHA reference data 336 may originate from data stored on edge device 302 including user account 314, biometric 316, non-biometric 318, electronic signature 320 and engagement data 322. In some embodiments, cryptography application 330 generates an encrypted reference data file for CAPTCHA reference data 336 to be stored as electronic signature 320 for use by DAV network 200 components. In some embodiments, a subject 402 may create a library of CAPTCHA reference data 336 files in various forms and types, each referenced with an encrypted electronic signature 320 for used by DAV network 200 components sending CAPTCHA resource requests 372. In other embodiments, the nature and type of CAPTCHA reference data 336 and subsequent electronic signature 320 created by subject 402 determined by DAV network 200 components, according to a specific operating requirements and/or instructions presented in a CAPTCHA resource request 372.

In an example of the present embodiment, once subject 402 captures biometric 316 data such as a face map or finger print, that information may designated by subject 402 to be used for CAPTCHA processes where it can be labeled, stored then encoded and encrypted data as electronic signature 320 for secure access use by DAV network 200 components that send resource requests 372 requiring a face map or fingerprint for identity validation or verification processes. A library of CAPTCHA reference data 336 establishes a larger pool of unique identification datasets, while novel resource requests 372 from DAV network 200 components create larger hurdles for external threats ability to mimic or copy a subject's 402 spontaneous presentation of random, contemporaneous combinations of personal information captured off-device. This method and technique preserves the private nature of the subject's data in several aspects, including 1) keeping original CAPTCHA reference data on device, 2) encrypting and encoding reference data, 3) providing access only via a secure VPN configured in a decentralized architecture, and 4) establishing random and contemporaneous scenarios for selecting and confirming user identity.

In some embodiments, CAPTCHA reference data 336 is generated by verification module 324 and identity logic 326. In some aspects, verification module 324 and identity logic 326 generate CAPTCHA reference data 336 by processing and configuring from data stored on edge device 302 including user account 314, biometric 316, non-biometric 318, electronic signature 320 and engagement data 322. In one example, a retinal scan stored as biometric 316 data is converted into a format and encoded such that when an identity resource request 372 is received by CAPTCHA engine 334 for an identity match using a retinal scan, the validation or verification process can be efficiently executed using a CAPTCHA reference data 336 version of the original biometric data 316. In some embodiments, CAPTCHA reference data 336 may originate from DAV network 200 components including DAV module 204, engagement client 206, cloud datacenter 208, and internet application 214. In some aspects, CAPTCHA reference data 336 originating from DAV network 200 components may be received and sent by DAV client 300. In other aspects, at least one edge device 202, DAV module 204, engagement client 206, cloud datacenter 208, or internet application 214 may send an automated request 372 for specific CAPTCHA engine 334 resources on edge device 302 and receive an automated response 388 based on the outcome of the executed resource. In one example of the process, a multi-stage CAPTCHA engine 334 validation and verification resource is requested by internet application 214 to confirm that 1) a current operator of edge device 302 (that is connected to internet application 214 via DAV module 204) is human and 2), a human subject is correctly associated with a designated user account 314 recognized by internet application 214. As detailed further in FIG. 3D, in some embodiments the CAPTCHA process may execute real-time video capture (utilizing component 304 camera) with sufficient resolution to verify that an edge device 302 user is a human subject 402 which, in some aspects, would satisfy the resource request 372 and a response 388 would be sent from CAPTCHA engine 334 to internet application 214 via client interface 306. In a second stage process step, in some embodiments CAPTCHA engine 334 confirms a match between the aforementioned real-time video capture and CAPTCHA reference data 336 created by subject 402, such as digital images of a subject's 402 face that are electronically mapped and converted to electronic signature 320. In some aspects, CAPTCHA engine 334 may be coupled to verification module 324 to generate a new digital face map as biometric 316 and electronic signature 320 data file of a current subject's 402 face for comparison to stored biometric 316 electronic signature 320 data stored in user account 314 held by the originating subject. In other aspects, CAPTCHA engine 334 may use computer-implemented calculation software and/or algorithmic 338 programs that compare a subject's 402 newly captured and original CAPTCHA datasets, providing values for probability of match and confidence level of the accuracy of the measure analysis, which in turn triggers a response 388 message to be sent to the DAV network 200 that initiated the resource request 372.

In some other embodiments, to improve process efficiency and accuracy, CAPTCHA reference data 336 is refined by CAPTCHA engine 334 coupled to identity logic 326 and algorithm 338 to create training reference datasets used to determine optimal process performance. In some aspects, algorithm 388 is comprised of machine learning and/or artificial intelligence software for improving CAPTCHA program data analysis and reducing error rates. In other aspects, a subject's 402 repeated exposure to DAV client 300 identity authentication and verification may include algorithm 338 and identity logic 326 data processes that access and/or produce training data for related identity validation and verification processes by identifying, modifying and/or deleting data based on optimal performance standards set for a specific process set or set of processes. In some other aspects, a subject's 402 repeated use of DAV client 300 would efficiently and continuously provide more accurate and reliable CAPTCHA reference data 336 to improves DAV network 200 processes, such as utilizing data refinement process steps that modify, replace or reject data files in various, as detailed further in FIG. 3E. In a third stage process step, in some embodiments CAPTCHA engine 334 deploys a challenge test 380 using CAPTCHA reference data 336, as described further in FIG. 3C. In some aspects, challenge test 380 is an application for initiating cognitive processes for human interaction that computerized and automated software programs cannot imitate or anticipate. In some embodiments, challenge test 380 requires a subject to physically interact with edge device 302 operational controls. In other embodiments, challenge test 380 does not require physical manipulation of edge device 302 controls including display screen, a mouse, or keyboard but rather "off-device" interactions using facial feature and voice capture and analysis methods and techniques.

In some embodiments, CAPTCHA engine 334, CAPTCHA reference data 336, verification module 324, and identity logic 326 operate and function collectively and independently with algorithm program 338. In some aspects, algorithmic program 338 is a random sequence algorithm coupled to components 304 and user account 314, biometric 316, non-biometric 318, electronic signature 320, engagement data 322 as well as data provided by via client interface 306 from DAV network 200 components including DAV module 204, engagement client 206, cloud datacenter 208, and internet application 214. In other embodiments, CAPTCHA reference data 336 may include, but not be limited to, user account 314 profile information, resource 372 instructions, response 388 information, images, video, coded data, and encrypted data. In some aspects, CAPTCHA engine 334 processes execute a random sequence algorithm 338 to generate and present CAPTCHA reference data 336 in stochastic or random process such that only human cognition could interpret, respond correctly and/or accurately to the information provided. In some aspects, a random sequence algorithm 338 may use one or more of the aforementioned datasets to present a visual or audible challenge for subject 402 to navigate, the challenge design being theoretically beyond the scope of known computer-implemented methods, in order to satisfy a CAPTCHA resource request to either validate or verify they are human or confirm they are the designated user account 314 holder. In some aspects, CAPTCHA reference data 336 may store images of a subject's 402 expressions generated by verification module 324 during onboarding of user account 314 biometrics 316 and repeated use of DAV client 300. In one example of a frictionless CAPTCHA test shown in FIG. 4, challenge test 380 may present random images of emoji images depicting expressions to a subject on an edge device 302 display with instructions for subject 402 to mimic the displayed emotions depicted by the emoji images in various arrangements or positions such as random sequences, at various locations on screen, or in a particular pattern such as clockwise or left to right, top row of a cluster of emoji images, or each image at the corners of a cluster of emoji images. In some embodiments, during the on screen presentation of emoji images, edge device 302 camera captures the subject's 402 facial responses for comparison and accuracy analytics via executable CAPTCHA engine 334 validation processes to compare the subject's 402 facial expressions with the presented emoji to determine a sufficient match, determined by the subject's response accuracy in the sequence or pattern described above, using a calculation application executed by algorithm 338 and a pre-defined acceptable error tolerance range 416. Based on a match level calculation of acceptable match threshold and/or accuracy, CAPTCHA engine 334 delivers response 388 to the originating DAV network 200 source that initiated request 372, as further detailed as process in FIG. 3D. In some aspects, challenge test 380 may be deployed in a variety of scenarios that use data analytic comparisons from the subject 402 whom created the original user account 314. In other aspects, CAPTCHA resource requests 372 can include instruction on selection of specific or random CAPTCHA reference data 336 generated from a subject 402 to be used for challenge test 380.

In some embodiments, data store 310 may store engagement data 322. In some aspects, engagement data 322 is generated from edge device 302 user interactions and system activities within DAV network 200, referred to as engagement events 452 in FIG. 4 and 514 in FIG. 5, by and components of DAV network 200. In some embodiments, data store 310 may store token data 328. In some aspects, token data 328 is digital asset data processed by cryptography application 330 and stored in wallet 332 configured with public and/or private keys to provide digital signatures for authorizing transactions, as detailed further in FIGS. 5-8.

FIG. 3B shows an exemplary group of DAV module 200 datasets 340. Generally, DAV module 200 datasets 340 require a suitable computing environment in which various aspects of the present disclosure may be implemented, as described in FIGS. 1-3A, but such illustrations are not intended to suggest any limitation as to the scope of use or functionality of the invention. In some embodiments, DAV module 200 datasets 340 comprise hardware, software, and data processes including sensors 342, modalities 344, behaviors 346 and engagement factors 348. For clarity, DAV module 200 datasets 340 may include specific named data or datasets, but are not limited to, those listed in FIG. 3B. In some aspects, DAV module 200 datasets 340 include applications and processes for capturing DAV client 300 data used for user identity and activity authentication and verification calculations including, but not limited to, user account 314, 3 biometric 316, non-biometric 318, electronic signature 320, and CAPTCHA reference data 336. In some embodiments, one or more DAV module 200 datasets 340 are calculated, interpreted or determined using at least one mathematical model executed by algorithm 338. In some examples, DAV module 200 datasets 340 calculations using algorithm 338 are made with execution of a machine learning or artificial intelligence data model.

In some embodiments, sensors 342 are devices capable of sensing and capturing biometric and physiological data, using at least one of components 304, as described in various depictions of the present invention. In some embodiments, modalities 344 are calculations and/or mathematical interpretations of sensor 342 data that indicate or determine a subject's physical state and/or biometric level, change in physical state and/or biometric level that is attributable to subject 402 in accordance with the present inventions. In some aspects, modalities 344 are active and require user action, interaction and/or control of a DAV network 200 component such edge device 202, engagement client 206, cloud datacenter 208 or internet application 214. In other aspects, modalities 344 are passive and do not require user action, interaction and/or control of a DAV network 200 component. In some embodiments, behaviors 346 are calculations and/or mathematical interpretations of data presented as individual or combinations of datasets from sensors 342 and modalities 344. In some aspects, calculations and/or mathematical interpretations of behaviors 346 may include DAV client 300 applications, such as verification module 324, identity logic 326, CAPTCHA engine 334 and algorithm 338. In some aspects, calculations and determinations of behaviors 346 associated with a subject may include training and or reference data comparisons, such as electronic signature 320, engagement data 322 and CAPTCHA reference data 336. In some examples, reference data comparisons may include access to generic data sourced from DAV network 200 components. In other examples, reference data comparisons may include access to generic data sourced from DAV client 300, such as biometric 316 and CAPTCHA reference data 336. In some embodiments, engagement factors 348 are calculations and/or mathematical interpretations of data presented as individual or combinations of datasets from sensors 342, modalities 344 and behaviors 346. In other embodiments, engagement factors 348 are determined by an adaptive multi-objective optimization method or process of measuring data and interpreting sensors 342, modalities 344, and behaviors 346. For example, an adaptive multi-objective optimization method may include a problem formula with a number of objectives and feasible set of decision vectors defined by some constraint functions, where the feasible solution is Pareto optimal to deliver the most practical outcome or solution, hereinafter referred to as engagement factors 348. In some other embodiments, engagement factors 348 are engagement data 328.

In some embodiments, behaviors 346 and engagement factors 348 are calculated in conjunction with real-time DAV client 300 processes to identify and capture user response and reaction data that is accurate and spontaneous. In some aspects, algorithm 338 may execute a mathematical model for interpreting and determining behaviors 346 and/or engagement factors 348 where data factors, such as weights and biases, may be contributed from one or multiple DAV client 300 processes such as identity manager 308, capture application 312, verification module 324, identity logic 326, and CAPTCHA engine 334.

Figure 3C:
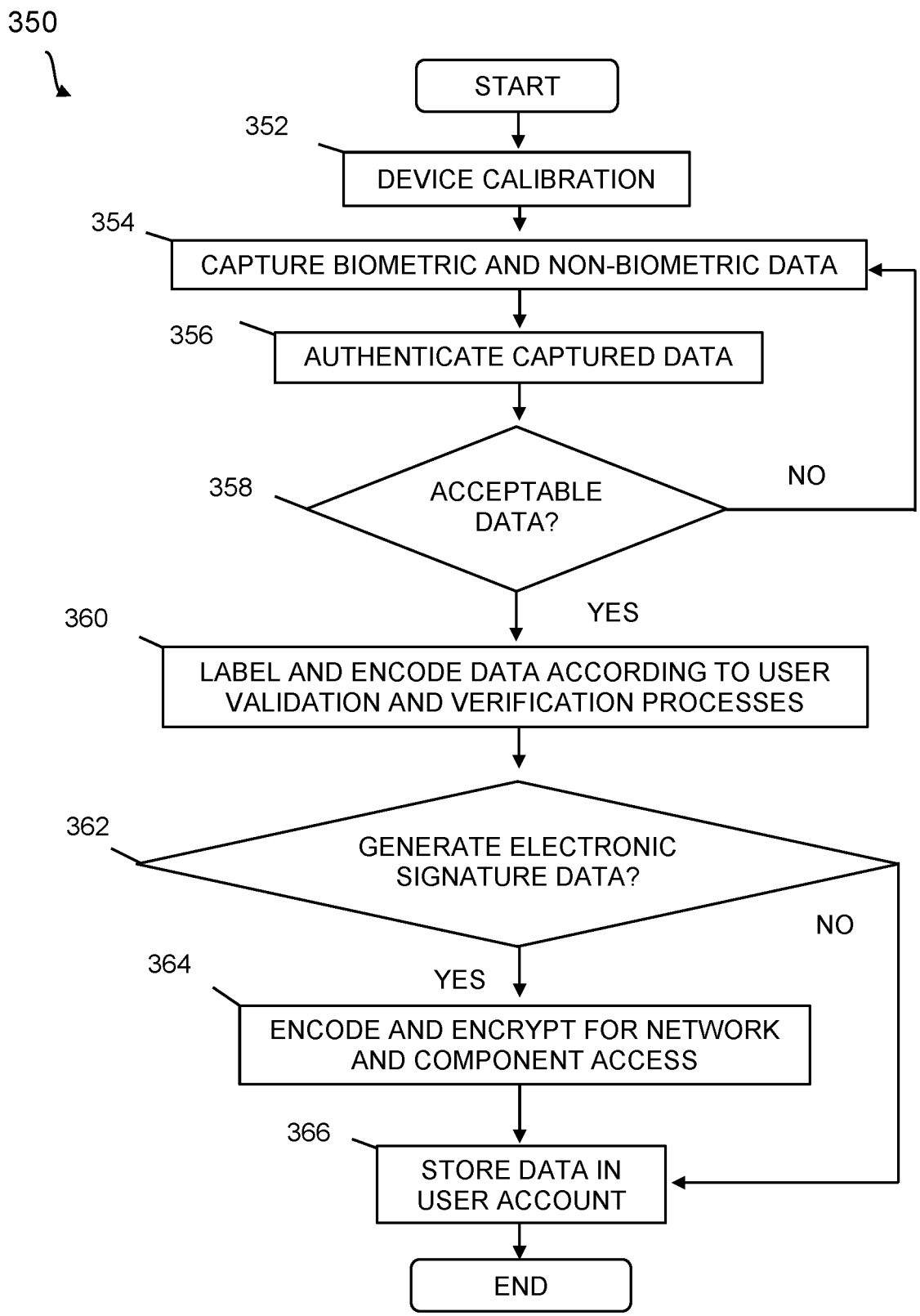
FIG. 3C is a flowchart of a method for establishing and authenticating a subject's identity using biometric and non-biometric information generated by the subject.
Figure 3D:
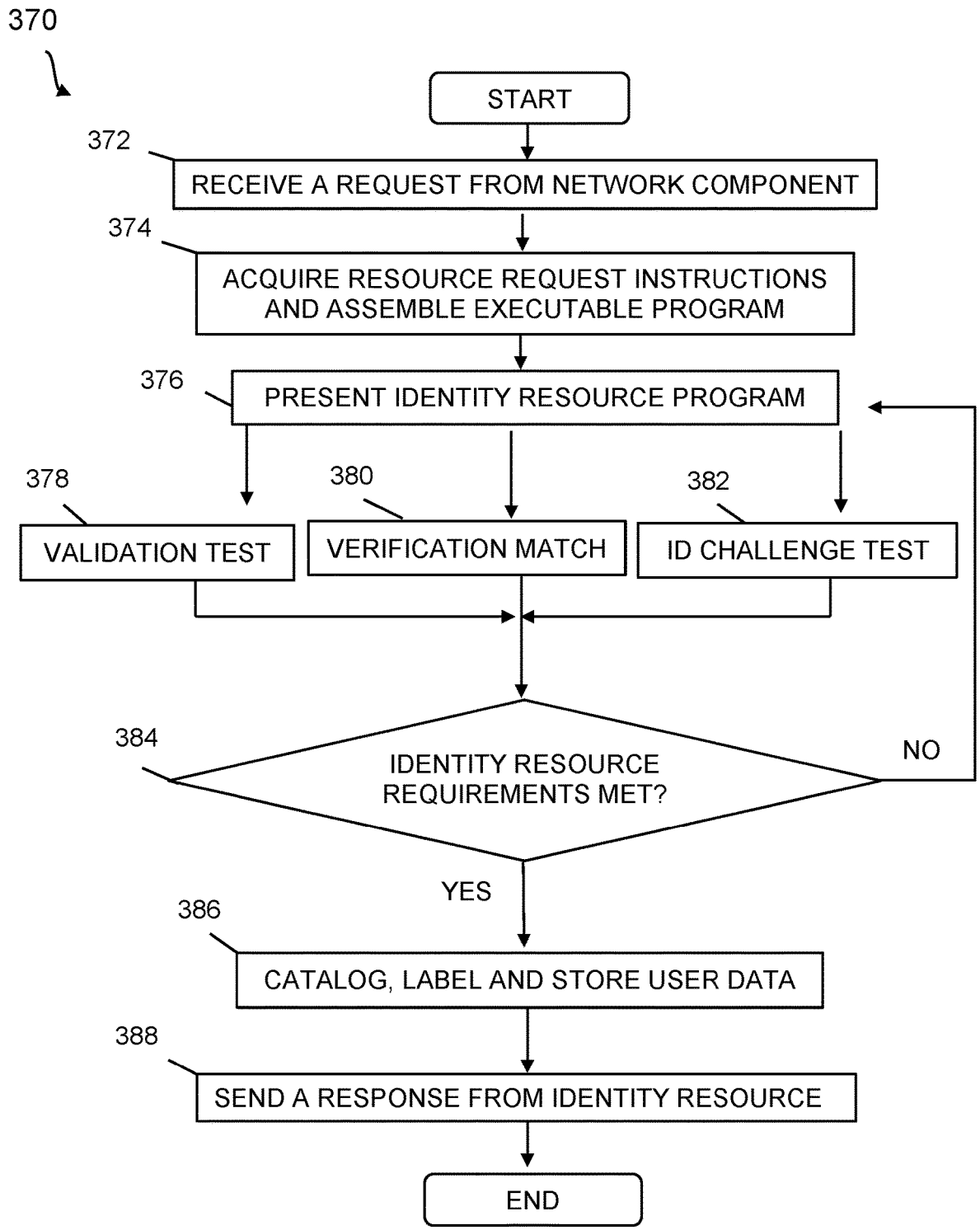
FIG. 3D is a flowchart of a method for executing an authentication process to confirm and/or verify the status of a live subject.

In some embodiments, DAV module 200 datasets 340 are selected according to a resource request 372, 402 and subsequent response 388, 410 delivered on DAV network 200 between respective components, as described in FIG. 3D and FIG. 4.

Figure 6:
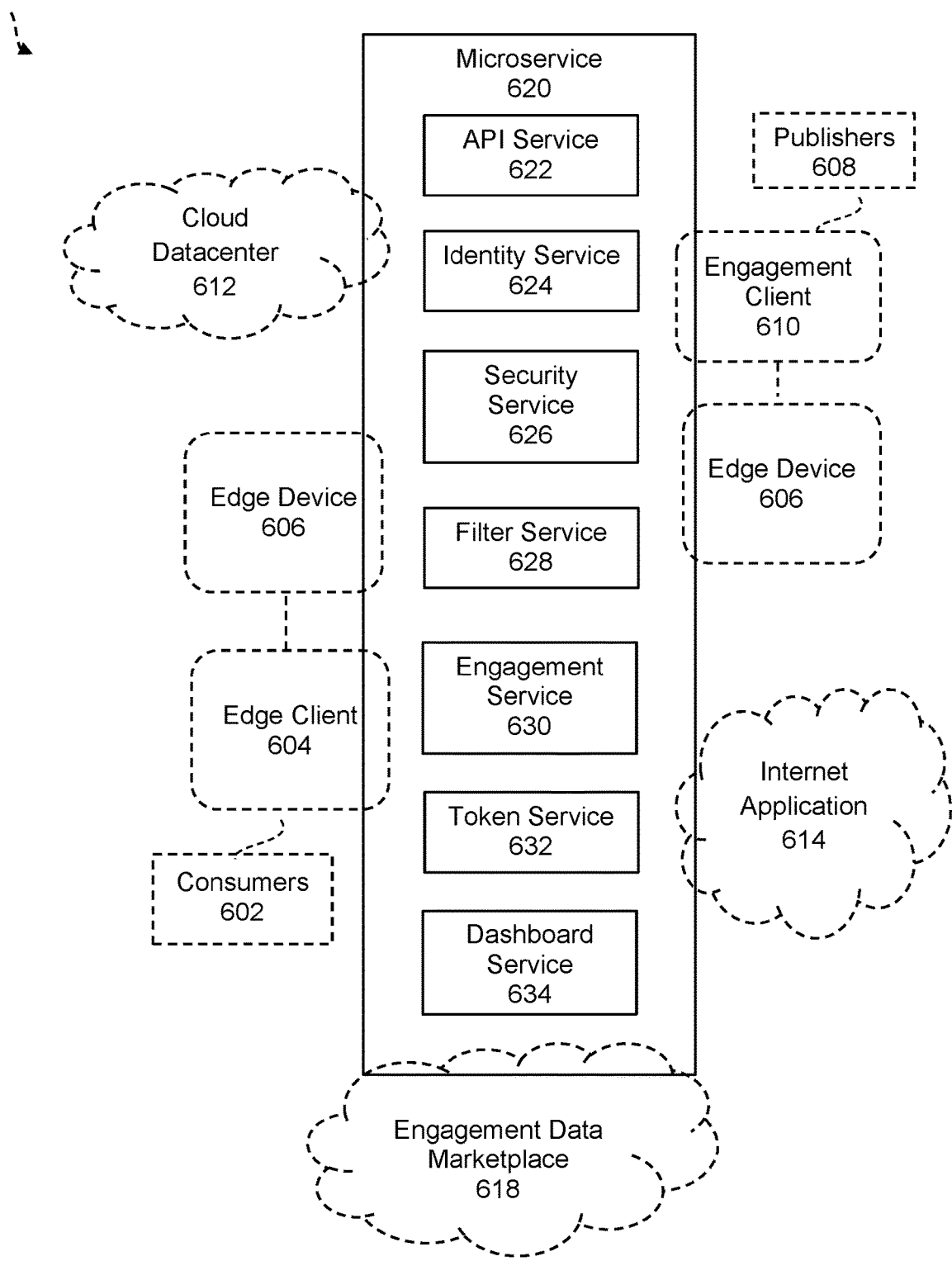
FIG. 6 is Illustrates a block diagram of an engagement intelligence marketplace exchange system 600.

In some other embodiments, DAV module 200 datasets 340 include data generated by microservice 620 programs that facilitate an engagement intelligence marketplace exchange platform network access, security, user controls, data transfer, engagement analytics as detailed further in FIG. 6.

FIG. 3C shows an exemplary flowchart of a method 350 for establishing and authenticating a subject's identity using biometric and non-biometric information generated by subject 402. In some aspects, methods 350 and 370 described below are done so with respect to the various applications, processes, components and computing environments depicted in FIGS. 1-3B, but such illustrations are not intended to suggest any limitation as to the scope of use or functionality of the invention where process steps may be performed in a different order and certain actions may be included or excluded based on variations of presented embodiment not disclosed herein. The flowchart begins at block 352 where method 350 executes a device calibration process configured to adapt DAV client 300 technical architectures to edge device 302. In some embodiments, device calibration involves configuration of edge device 302 hardware and software with DAV client 300 applications according to the requirements of a requested 372, 402 resource for identity validation or verification service as described in FIG. 3A. In some aspects, device calibration includes independently and/or collective operation of edge device 302 hardware and software components 304 with DAV client 300 applications, such as client interface 306, capture application 312 and verification module 324. In some aspects, at block 352 DAV client 300 compatibility and adaptation process evaluates and determines performance capacity and/or limitations of edge device 302 hardware and software related to processing data, program execution, data storage, encryption, communications, graphics processing, and the like. In some aspects, block 352 calibration processes enable DAV client 300 to adjust operational performance according to computing environment available on edge device 302, such that overall performance is optimal, accurate and reliable in areas including data capture, analysis, storage, calculation processes and other functions. In some embodiments, at block 352, DAV client 300 may solicit and receive resources from DAV network 200 components may to improve DAV client 300 operations including, but not limited to, software updates, user profile data, process and application files, reference library data, cloud data compute utilities, and the like. At block 354, method 350 processes capture, identify and label biometric 316 and non-biometric 318 data and information. In some embodiments, at block 354, verification module 324 is coupled to identify logic 326, components 304 and capture application 312 to identify, collect, label and store presented biometric 316 and non-biometric 318 data and information. In some other embodiments, at block 354, verification module 324 is networked with DAV network 200 components configured to obtain, collect and/or label biometric 316 and non-biometric 318 information including compute resources such as computational models, image category references, data libraries and the like. In some aspects, biometric 316 and non-biometric 318 may be obtained verification module 324 using the above embodiments or variations thereof by applying depth sensing computer vision, machine learning, pattern recognition, and/or numerical feature or vector feature enabled techniques. In other aspects, biometric 316 data and information may include, but not be limited to, face detection, facial mapping, retinal scanning, fingerprint scan, voice mapping and similar applications using computer vision implemented methods. In still other aspects, non-biometric 318 data and information may include, but not be limited to, facial expressions, physical gestures, body position, 3D mapped image and objects, or similar applications using computer vision and audio recording implemented methods. At block 356, method 350 processes analyze and validate the provenance of information submitted at block 354 for use by DAV client 300 and DAV network 200. In some embodiments, provenance for biometric 316 and non-biometric 318 is established when subject 402 creates user account 314 profile, wherein submitted data becomes the original reference point for validating and verifying a user's identity. In one example of method 350 processes at block 354, a subject's 402 physical features, captured as numerical feature or vector feature and stored in immutable data form using cryptography application 330, creates a permanent record of reference information wherein all future comparisons must match in order for subject 402 to successfully access DAV client 300 applications on edge device 302 or interact with DAV network 200 components. At block 358, method 350 processing logic determines if information authenticated at block 356 will be accepted and assigned to a specific user account 314. In some embodiments, verification module 324, coupled to identify logic 326, will require the subject 402 to submit biometric 316 or non-biometric 318 information for comparison with known vector features originally stored as immutable data associated with the subject's 402 user account 314, whereby confirmation of the match will enable acceptance of the newly presented user account 314 profile information at block 360. In other embodiments, should the information authenticated at block 356 and submitted at block 358 be declined as acceptable or a match to existing user account 314 data, method 350 would require a repeat of the validation process at block 356 or creation of new original identification data at block 354. In one example, if subject whom had set up their account using a retinal scan later chooses to submit images of the facial expressions, the verification application 324 would first require confirmation of the retinal scan prior to accepting the facial expression data. At block 360, in some embodiments, method 350 processes operate verification module 324 coupled to identify logic 326 to format, label, encode and configure newly presented data as biometric 316 or non-biometric 318 information for use by DAV client 300. At block 362, method 350 processing logic, according usage designed by subject 402, may encode and label information documented at block 360 for use as electronic signature data 320 by DAV client 300 and DAV network 200 components for validation, verification and other applications depicted in the present invention. Generally, electronic signature data 320 involves more comprehensive techniques for generating reference data used for specific identification applications operating on DAV network 200 including methods for capture, mapping, formatting, presenting and analyzing reference data. In some embodiments, method 350, at block 364, may be generate and codify electronic signature data 320 using verification module 324, identify logic 326 and cryptography application 330 wherein the private characteristics of the original electronic information identified at block 360 remain on edge device 302, yet are represented in protected code form for use by designated DAV network 200 components and users via VPN 112 and encryption/decryption applications detailed in FIG. 1. If the new obtained data is not converted to electronic signature data 320, the flowchart ends at block 366 where the newly captured user information and electronic signature data 320 will be categorized, label, stored with an associated user account 314 by DAV client 300 and DAV network 200 components.

FIG. 3D shows a flowchart of a method 370 for executing an authentication process to confirm and/or verify the status of a live subject. For clarity, identity validation or verification process may be referred to herein after as an "identity resource" and refer to applications configured to validate or confirm the presence of live human subjects (including CAPTCHA processes), verify that a user identified by the system is the correct individual associated with a specific or named user account, and/or confirmation that engagement activity attributed to a user account has legitimately been generated by the subject that created the original user account profile. In some embodiments, the flowchart begins at block 372, where method 370 processes facilitate one or more DAV network 200 component instructions to facilitate an identity resource request to edge device 302 for validating and/or authenticating a subject's 402 identity. In other embodiments, at block 372, method 370 processes route client interface 306 resource request instructions to a DAV client 300 application, such as identity manager 308, verification application 324, and/or CAPTCHA engine 334. In some examples, the resource request instructions may be sent via a secure VPN 112 from a DAV network 200 component as an encrypted data file, requiring client interface 306 to route the resource request data and instructions to a decryption process executed by cryptography application 330 that unpacks and decodes resource request and instructions for DAV client 300. At block 374, according to resource request instructions at block 372, method 370 processes assemble DAV client 300 applications and configure edge device 302 software and hardware to execute an identity resource program for identity management, validation, and/or verification. In some aspects, identity resource processes and reference data are stored on edge device 302, where selection and deployment are determined by the resource request instructions. In other aspects, identity resource processes may require data updates or inputs and additional software instructions and/or reference data sourced from DAV network 200 components. At block 376, method 370 processes execute a program on edge device 302 according DAV client 300 applications and processes in accordance with the prescribed requested identity resource. In some embodiments, at block 378, method 370 processing logic determines if subject 402 is a human. In other embodiments, at block 380, method 370 processing logic determines if biometric 316 or non-biometric 318 data presented by subject 402 can be positively compared with user account 314 information stored on edge device 302 or DAV network 200. In other embodiments, at block 382, method 370 processing logic determines the identity of a subject 402 using a performance challenge, such as a frictionless CAPTCHA test, by executing randomized requests for presentation of recorded biometric 316 or non-biometric 318 data associated with subject 402. In some embodiments, at block 384, method 370 processing logic determines if identity resource program result is acceptable, and if identity resource requirements are met, at block 386 the information is cataloged, labeled and stored as detailed in FIGS. 3B-C. In other embodiments, at block 384, where method 370 processing logic determines identity resource program result is not acceptable, the program is executed again at block 376 for a set number of sequences before the method 370 ends. At block 388, the method 370 ends with a resource response, according processing logic at block 384 and formatting at block 386, being sent the original DAV network 200 component that originated the resource request 372.

Figure 3E:
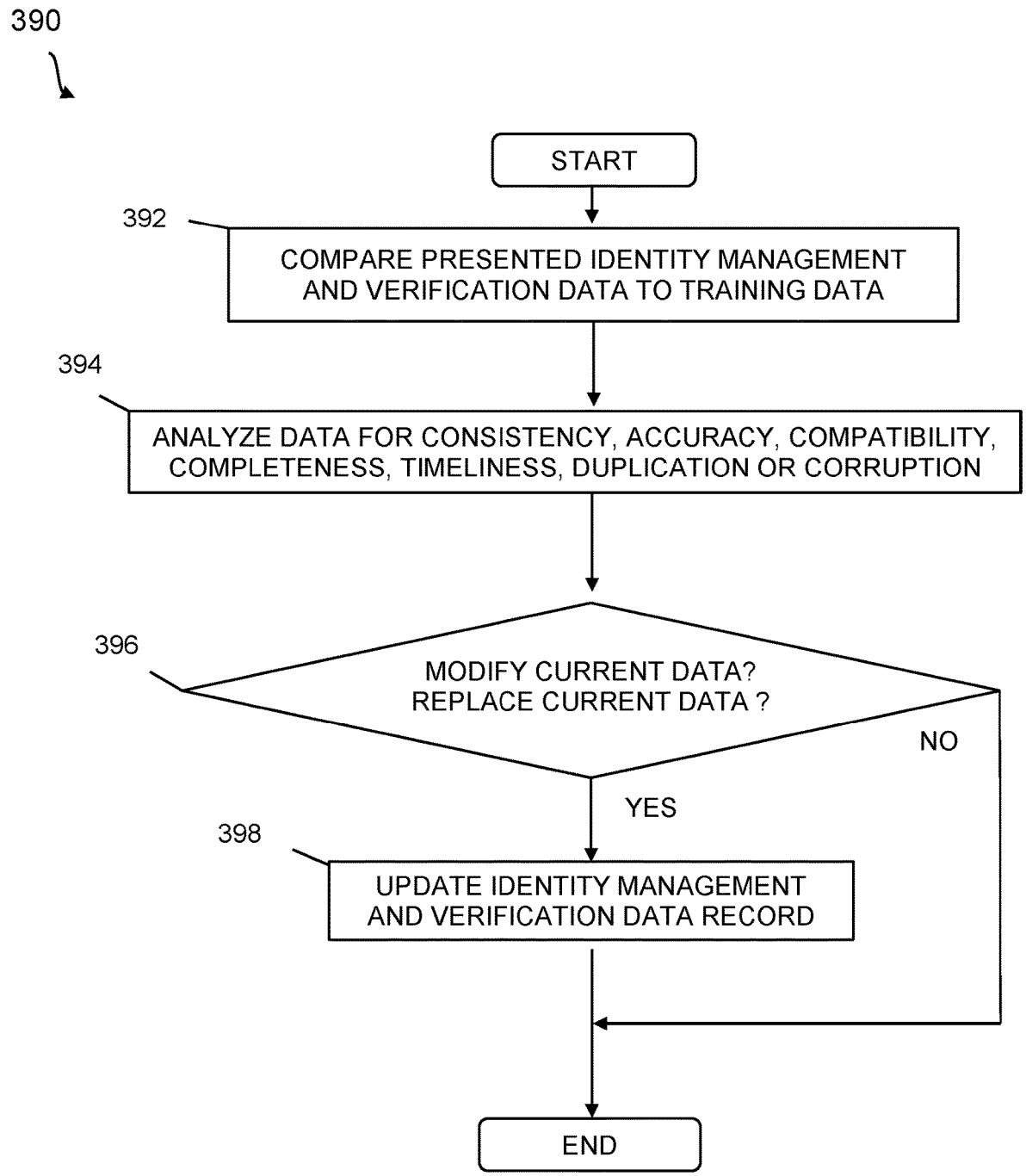
FIG. 3E is a flowchart of process steps for improving CAPTCHA reference data.

FIG. 3E shows a flowchart of a method 390 for improving identity management and verification reference data. Overall, DAV client 300 and DAV network 200 identity management and verification related applications are configured to improve upon commonly used identity management and user validation solutions with more efficient and accurate techniques for detecting human subjects and verifying that a presented subject is the user account 314 holder of record. Generally, method 390 improves the quality of the data utilized DAV client 300 and DAV network 200 identity management and verification related applications with deployment of machine learning and/or artificial intelligence learning models that use training and reference data to detect subtle data patterns, adjust operational internal parameters, and reliably discriminate similar patterns in data it has not seen before, without explicit program instructions to do so. In some aspects, method 390 process steps are embodiments of DAV client 300 and DAV network 200 software applications that are configured for real-time, batch operation, on-premises or cloud operations that assess and improve data quality on a moment-by-moment basis including, but not limited to, evaluating data for consistency, accuracy, compatibility, completeness, timeliness, duplicate or corrupted records. In other aspects, method 390 may include DAV client 300 and DAV network 200 software embodiments for data acquisition and creation, data enrichment, data unification and maintenance, data protection and retirement, and data discovery.

In some embodiments, the flowchart begins at block 392, where method 390 processes facilitate data ingestion by one or more machine learning and/or artificial intelligence applications that, while operating on DAV client 300 and DAV network 200 components, are configured as data quality models. In some aspects, machine learning and/or artificial intelligence data quality applications and training models are facilitated by algorithm 338. In other aspects, training data for block 392 processes may be generated by DAV client 300 or DAV network 200 resources, such as user account 314 reference data or generic training data stored on cloud datacenter 208. In some embodiments, to promote process integrity, reference and/or training data is the initial data used to develop learning models, including data acquisition, labeling, preparation and methods for cleaning and filtering data. At block 394, method 390 data quality models analyze presented information for assessments of consistency, accuracy, compatibility, completeness, timeliness, duplication or corruption. In some embodiments, method 390 may deploy different learning and training data models as well as varying data formats, depending on the types of data related problems to be solved. In some aspects, algorithm 338 deploys supervised machine learning models where reference and training data is labeled. In other aspects, algorithm 338 deploys unsupervised machine learning models learning where reference and training data is unlabeled. In some other aspects, algorithm 338 deploys an artificial intelligence model configured to initial train block 394 data quality models, then retrain block 394 data quality models as the quantity and quality of data input into the system grows. In some embodiments, block 394 processes may include use of validation datasets to assess and inform on algorithm 338 parameters and performance. In some embodiments, block 394 processes may include use of test data to measure the accuracy and efficiency of algorithm 338 training configurations. At block 396, method 390 processing logic delivers data management recommendations according to parameters set by respective identity management and verification operations. In some aspects, operation parameters may include, but not be limited to, optimizing performance, reducing data error ratio, improved prediction or recommendation analytics, and the like. In some other aspects, based on data evaluation results and operation parameter instruction, presented identity management and verification data 392 may result in recommendations to be partially modified or replaced based on the designated process outcome. If block 396 processing logic results determine no changes should be made, then process 390 ends. If block 396 processing logic results determine that changes should be made, at block 398 identity management and verification data records are created, modified and/or updated, and process 390 ends.

FIGS. 4A, 4B, 4C, and 4D are illustrations of methods for deploying non-physical or frictionless identity management tools on networked multifunctional smart devices, including reverse turing tests or CAPTCHAs (Completely Automated Public Turing test to tell Computers and Humans Apart). The embodiments depicted in FIGS. 4A-D, aspects and details of which have also been described in FIGS. 1-3D, are only a few examples frictionless identity management tools and are not intended to unduly limit the claimed embodiments of the present invention where other versions may have more or fewer components such that one of ordinary skill could reduce to practice many variations, modifications and alternatives. Generally, the advantages of the proposed frictionless identity management (FIM) 400 involve compute/hardware resource configurations and reverse turing frameworks that inhibit computerized hacks of conventional identity management and CAPTCHA systems by capturing and measuring human input and behaviors that transpire "off-device" with minimal or no physical operation of networked multifunctional smart device controls. Generally, a "subject" 402 refers to a human physical form, features, attributes, speech, sounds and behaviors that can be detected, identified, labeled, categorized, analyzed and ultimately interpreted according to the innovation described in the present disclosure. In some examples, a non-human subject 402, such as an animal or pet, may provide human like attributes and behaviors sufficient to generate FIM 400 data as described herein.

In some embodiments, FIM 400 data may include individual or combinations of a particular subject's 402 physical or biometric 316 data measured with sensors 342 with minimal or no operation of edge device 302 haptic controls, such as a button or touch screen user interface. In other embodiments, FIM 400 data may include modalities 344 and behaviors 346 associated with subject 402. In some other embodiments, off-device data input may include individual or combinations of particular subject's 402 non-biometric 318 information that is measurable with edge device 302 components 304 and sensors 342 with minimal or no operation of edge device 302 haptic controls, such as a button or touch screen user interface.

Generally, in some embodiments, FIM 400 methods are defined by resource request 404 and response 410 data comprising information that may include, but not limited to, the type and nature of identity management and/or verification application or process to be deployed; a subject or group of subjects anticipated to experience the deployed application; instructions on deployment; instructions directing a subject how to interact with the resource; data anticipated to be collected, evaluated, interpreted and/or measured; desired outcomes as determined by pre-set parameters including but not limited to, data acquisition consistent with designated parameters, performance threshold or benchmark value, an acceptable error tolerance range, and the like. In some aspects, resource request 404 may vary depending on the nature of the engagement, the initiating DAV network 200 component, and available FIM 400 resources available on edge device 302. In one example, subject 402 seeking engagements on certain DAV network 200 component may be required to establish specific FIM 400 resources, including providing biometric 316, non-biometric 318 and CAPTCHA reference data 336, to establish an initial range of FIM 400 resources from which a remote DAV network 200 component can both reference and randomly select from, which creates a depth and range of subject-centric comparison datasets to elevate security and reduce fraud risk within programmatic schemes via internet enabled networks.

In some embodiments, FIM 400 resource request 404 and response 410 data and information are encrypted as blockchain data by a cryptographic program, such as cryptography application 330, and transmitted via decentralized VPN 112 between DAV network 200 components. In some aspects, FIM 400 methods in this scheme create several protection barriers for a subject's 402 spontaneous behavioral data generated from activities, engagements and communications with DAV network 200 components. In some examples, this approach offers several advantages that make it more difficult for remote computer system threats to 1) access or disrupt secure FIM 400 communications between users, 2) anticipate CAPTCHA test instructions, 3) mimic spontaneous off-device human responses, or 4) duplicate or spoof an authentication process limited to device controls. In some embodiments, FIM 400 operations are executed using various configurations and arrangements of components 304, verification application 324, identity logic 326, cryptography application 330, CAPTCHA engine 334, CAPTCHA reference, and/or cryptography application 330 or a combination thereof including, but not limited to, operations and functions described in FIGS. 3A-D. In some other embodiments, edge device 408 is edge device 302. In still other embodiments, edge device 408 is edge device 202.

As depicted in previous FIGS. 2 and 3A-D, in some embodiments, FIM 400 resource request 404 may originate from any DAV network 200 system applications or components, including automated edge device 202 operations and subject 402 initiated operations on edge device 202, as well as interactions with DAV module 204 and internet application 214. In some aspects, resource request 404 and response 410 may be generated from DAV module 204 applications and DAV network 200 component and/or system events including, but not limited to, software management, security protocols, user identity management, identity management reference data, blockchain encryption, VPN management, communications protocols, cloud server management, machine learning and artificial intelligence programming, and the like. In other aspects, resource request 404 and response 410 may be generated from subject 402 component input, platform and device control activity, or engagement activities associated with DAV module 204, edge client 206 and internet application 214 such as, but not limited to, web browsing, posting media or text messages, tagging favorites for purchase or filling a shopping cart, adding a "like" notification, a login sequence, completing a survey, providing biometric and physiological response data during a media exposure, and the like. In some other aspects, resource request 404 and response 410 may be comprised of source code instructions, data and/or markup instructions including, but not limited to, JavaScript, JSON, XML data, Hypertext Markup Language ("HTML'), extensible hypertext markup language (XHTML) data, JavaScript Object Notation (JSON) data, JSON with padding (JSONP) and/or some combination thereof. In still other aspects, resource request 404 and response 410 data may be comprised as, but not limited to, text, plugins, code, packets that are loaded and executed on DAV network 200 components such that resource request 404 and response 410 may integrate with and/or operate on websites, progressive websites, internet server architectures, native applications, native application servers, distributed server networks, secure virtual private networks and the like. In some embodiments, as referred to in FIG. 3A-D, a resource request 404 initiates compute resources and reference data for use by verification application 324 and/or CAPTCHA engine 334. In some aspects, resource request 404 includes instructions 406 that determine how an application operates and how a subject 402 may interact with the application. In some other aspects, operations may include user controls 412 to start a function, stop a function and reset a function. In some aspects, user controls 412 are prompted by a unique voice command, specific device movement, biometric 316 information such as facial expressions, eye movement, head position, and non-biometric 318 such as hand gesture, arm movement, body position, unique image and/or a combination of one or more elements.

Generally, as previously described in FIGS. 3A-D, in various embodiments a "resource" for use on DAV network 200 may include computer applications configured for identity management, validation, and/or verification. Generally, many of the embodiments depicted below may be used as a single step or multiple-step process in a variety of configurations to authenticate onboarding of biometric 316 and non-biometric 318 information used to establish user account 314 profiles, validating subject 402 human status, or verifying that subject 402 is the appropriate rights holder to a user account 314 by using comparative analysis programs to confirm subject 402 information presented in real-time with the original user account 314 information stored as immutable data for reference purposes. In some aspects, FIM 400 identity management resources may involve operations including, but not limited to, creating a user account 314 profile, onboarding biometric 316 and non-biometric data 318 associated with a user account 314 suitable for FIM 400 applications, or converting user information into electronic signature data 320. In other aspects, FIM 400 identity validation and verification resources may involve authenticating subject 402 resource response 410 data. In some embodiments, FIM 400 may execute the validation application by displaying alphanumeric and multimedia content 414 along with instructions 406 including images, photos, text, symbols, numbers, video, and the like. Theoretically, there are unlimited versions and configurations of FIM 400 applications that may achieve the desired outcomes depicted herein, and the technical and descriptive representations of FIM 400 applications are merely exemplary and not intended to unduly limit the claimed embodiments of the present invention. One of ordinary skill in the art would recognize many possible variations, alternatives, and modifications for techniques and methods for reducing to practicing certain components or combinations of the proposed technology.

As shown in FIG. 4A, in one exemplary embodiment of a human status validation FIM 400 application, the process begins with a request 404 for computing and data reference resources assembled on edge device 302. In some aspects, resource application execution is initiated by verification application 324, and in some cases identity logic 326, including instructions 406 that direct and guide subject 402 on how to interact with the application on edge device 302 and achieve desired outcomes using controls 412 that operate the software. In one example of the present case, shown in FIG. 4A, a FIM 400 application for human status validation may include a two-step process where CAPTCHA reference 336 includes content 414 comprising a set of emojis in categories that correlate with generic emotion recognition reference files, where subject 402 is instructed first, to mimic the facial expression of an emoji located at a specific reference point within a group of displayed emojis and, second, say the name of that same emotion out loud as, meanwhile, FIM 400 captures the subject's facial expression and audible response information for comparison to CAPTCHA reference 336 data, where the correct expression displayed and audible response by subject 402 satisfies the test. In some aspects, facial expression and speech reference data may be generic facial expression and speech analysis data obtained from DAV network 200, using components 304 and executing a comparison calculation using algorithm 338. In some embodiments, mathematical values from a data comparison calculation using algorithm 338 may be used to determine whether the captured response data falls within an acceptable error tolerance range 416 to CAPTCHA reference 336 data. In some aspects, FIM 400 application compares facial map of subject 402 and deploys a speech to text application to validate the word(s) spoken by subject 402, before and after the exposure to the resource program. In other embodiments, FIM 400 application may apply predefined thresholds or limits for an acceptable error tolerance range 416 with which a determination can be made regarding subject 402 response data. In some aspects, if subject 402 response data is within the acceptable error tolerance range 416 limits, then it is accepted and FIM 400 may create user account 314 records including biometric 316 and non-biometric 318 data, electronic signature 320 and/or CAPTCHA reference 336 data. In some other aspects, if subject 402 response data is not within the acceptable error tolerance range 416 limits, the FIM 400 application may permit a set number of executions before ending. In some other aspects, regardless of the FIM 400 determination of human validation, a resource response 410 may be sent to one or more DAV network 200 components, including the source of the original resource request 404.

FIG. 4B depicts a similar FIM 400 process for human status validation in another embodiment, where resource request 404 and instructions 406 direct subject 402 to mimic content 414 comprised of individual emojis or descriptions of emotions presented in a particular pattern, sequence, format or order. In some aspects, content 414 may be comprised of text of emoji images representing emotions such as "happy," "angry, "sad" presented on edge device 302 display with instructions 406 for subject 402 to mimic the emoji images according to the emotions they appear to represent. In some examples, emoji images that do not depict expressions may be presented during the display sequence as a higher challenge for automated systems to detect and overcome. In other aspects, content 414 may be comprised of text-based descriptions of emotions such as "happy," "angry, "sad" presented on edge device 302 display with instructions 406 for subject 402 to mimic the words presented that describe emotions. In some examples, a word or group of words not describing emotions may inserted into the display sequence has a higher challenge for automated systems to detect and overcome. In some aspects, FIM 400 may perform a process of measuring subject 402 response data to the presented content 414 as directed by instructions 406, the accuracy of which is determined by algorithm 338 based on acceptable error tolerance range 416 when evaluated against comparable CAPTCHA reference 336 data. To complete the process, FIM 400 sends resource response 410 information confirming the accuracy and/or validation determination of FIM 400 application interaction results.

FIG. 4C depicts a FIM 400 process for human identity verification in an embodiment where resource request 404 and instructions 406 direct subject 402 to observe and react to content 414 comprising a group or cluster of emoji image expressions. In the present case, user verification process will obtain CAPTCHA reference 336 data generated from a user account 314 profile for comparison to information presented during FIM 400 processes. In some aspects, user account 314 profiles may include CAPTCHA reference 336 data generated from DAV client 300 applications including, but not limited to, facial mapping and eye tracking measurements created during user account 314 data onboarding, calibration of edge device 302 hardware and software components 304 for optimal DAV client 300 performance, and cumulative biometric 316 or non-biometric 318 data acquired from a subject's repeated use of DAV client 300 used to update and refine CAPTCHA reference 336 data. In other aspects, user account 314 profile information may include biometric 316 or non-biometric 318 stored as immutable data on edge device 302 such as a facial map, retinal scan, fingerprint, or image of personal tattoo, birthmark, scar, and the like.

In some other aspects, instructions 406 direct subject 402 to observe an arrangement or cluster of emoji images and mimic the emotions represented by emojis that change color in a particular sequence or order. In still other aspects, instructions 406 direct subject 402 to mimic the emotions represented by emojis located at specific locations within the emoji cluster, in a specific pattern such as images located at each corner of the cluster and mimicking the emotions in clockwise pattern. In the present case, in one embodiment, FIM 400 may perform a two-step identity verification process using eye tracking and emotion recognition CAPTCHA reference 336 data associated with subject 402 assumed to be the rightful account holder of user account 314 data. In one aspect, FIM 400 tracks the accuracy of subject 402 eye movements compared to data plots previous calibrated on an edge device 302 display in an order or sequence defined by instruction 406 and, in another aspect, FIM 400 measures the accuracy of the emotion mimic response data provided by subject 402, where both calculation methods determine identity verification values within, or not within, an acceptable error tolerance range 416, and FIM 400 delivers resource response 410 to the originator of resource request 404.

FIG. 4D depicts another FIM 400 process for human identity verification in an embodiment where resource request 404 and instructions 406 direct subject 402 to present non-biometric 318 information for comparison with CAPTCHA reference 336 data. In some other aspects, as mentioned previously, non-biometric 318 information may include information that may be captured and measured with components 304 and converted into CAPTCHA reference 336 data such that it may be easily accessed or produced by subject 402. In one example, subject 402 may generate a two-dimensional or three-dimensional photo using edge device 302 of a unique tattoo, birthmark or scar on their body and generate an image that is converted into vector features for use by the process. In another example, a subject make take a three-dimensional photo of a physical object such as a watch, bracelet, charm, ring as a unique item that can be converted into vector features. In another example, subject 402 may record a pattern of physical gestures with their body or appendages in a pattern that can be measured geometrically and mapped for comparison by the process including, but not limited to, one or more hand positions, hand symbols, arm positions, head movements, facial feature changes, and the like. In the present case, in one embodiment, FIM 400 may perform an identity verification process using any biometric 316 and/or non-biometric 318 data that is measurable as CAPTCHA reference 336 data associated with subject 402. In some aspects, based the nature of the resource request 404, instructions 406 may include a randomized query, sequence or sort of non-biometric 318 that subject 402 may be challenged to present for comparison, creating more difficulty for automated systems to detect and duplicate. In one example of the present case, the process may conduct a retinal scan comparison and make an image comparison of a tattoo. In another example, the process may conduct a facial landmark and feature scan of subject 402 in addition to capturing a unique hand symbol sequence (such as thumb up, thumb down, thumb sideways) created by subject 402. As previously detailed FIM 400 measures the presented information and provides a comparison determination within an acceptable error tolerance range 416, and then delivers resource response 410 to the originator of resource request 404.

Figure 4E:
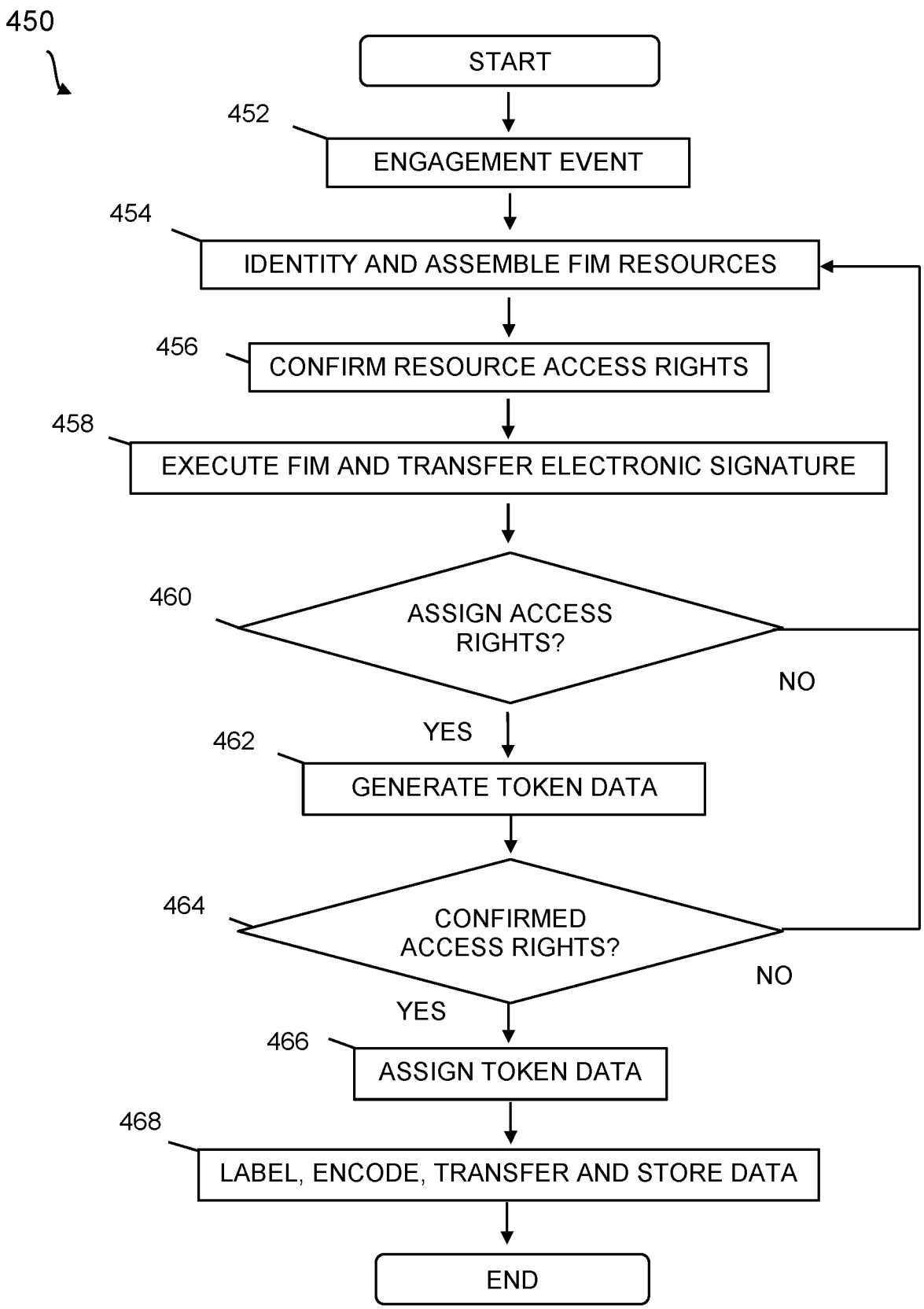
FIG. 4E is a process flowchart for FIM resource management in association with an engagement analytics platform.

FIG. 4E Illustrates a flowchart for a process 450 for FIM 400 resource management in association with an engagement analytics platform. Process 450 can be performed on DAV network 200 including one or more components including edge device 202, DAV module 204, engagement client 206, cloud datacenter 208, and internet application 214. In some embodiments, process 450 begins at block 452 where subject 402 initiates or experiences an engagement event 514 according to user actions and interactions on DAV network 200, as described in FIGS. 1-4D. Generally, an "engagement event" is the measurable technical action, set of actions, instances, behavior, condition or threshold on DAV network 200 that triggers a resource request 404. In some aspects, an engagement event 514 is initiated by subject 402 such as, but not limited to, a login sequence, posting social media, viewing media content, sharing chat session information, browsing native apps or websites. In other aspects, engagement event 514 may be an automated software operation or service performed by DAV network 200 components such as, but not limited to, a user authentication program, a secure VPN access confirmation sequence, assigning user privacy requirements, measuring engagement metrics, and cryptographic programs. Based on the nature of the engagement event 514 at block 452, at block 454 process 450 identifies and assembles FIM 400 resources according to instructions 406. At block 456, process 450 verifies and validates subject 402 access rights with the assembled FIM 400 resource, in some instances, a human validity check or a user verification confirmation as described in FIGS. 4A-D. At block 458, process 450 executes FIM 400 resource application and the outcome determination is encrypted as electronic signature data 320 for delivery via secure VPN 112 as resource response 410 to the origination source of the resource request 404. At block 460, process 450 logic assigns subject 402 access rights according to the determination at block 458. If access rights are granted at block 460, process based on parameters, permissions, and/or authority according to instructions 406, process 450 may generate a digital asset or token value via smart contract at block 462 according to engagement event 514 data parameters defined and confirmed by the assignee and assignor. If access rights are not granted, process 450 may direct subject 402 to block 454, where the sequence between the respective blocks executes a set number of times before ending. At block 464, process 450 operates a FIM 400 resource to perform a human validity check or a user verification confirmation prior to assigning digital asset or token data rights. If "yes" at block 464, at block 466 process 450 assigns digital asset or token rights. If "no" at block 464, process 450 may direct subject 402 to block 454, where the sequence between the respective blocks executes a set number of times before ending. Process 450 ends at block 468, where all engagement event 514 activity associated with subject 402 is categorized, labeled, encoded, transferred and stored as user account 314 data and related subcategories as well as data that is labeled and encoded then transferred and stored on respective DAV network 200 components.

Figure 5:
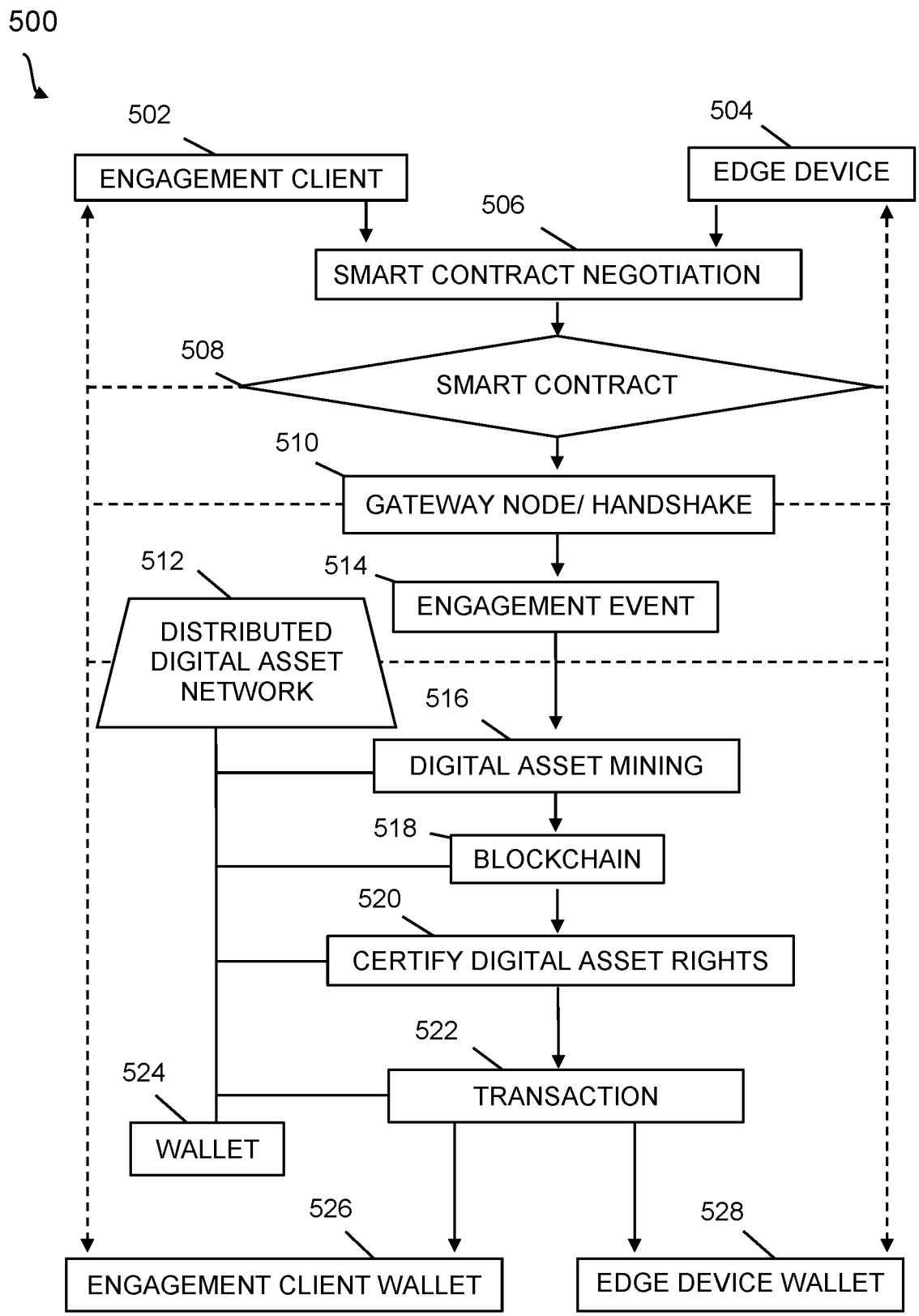
FIG. 5 is a flowchart of a DAV network process for digital asset resource origination, specification, transaction and association within an engagement analytics system.

FIG. 5 is a flowchart of a DAV network 200 process 500 for digital asset resource origination, specification, transaction and association in an engagement analytics system. In some embodiments, process 500 is facilitated by a cloud datacenter 208 microservice 620 that begins with at least at least one publisher 212 and at least one consumer 210 interacting via edge device 202, engagement client 206 and internet application 214 coupled to a website, native mobile application, or online platform where hardware and software access DAV module 204 on DAV network 200, as previously described in FIG. 2. In some embodiments, engagement client 502 is engagement client 206. In some embodiments, edge device 504 is edge device 302 and operates DAV client 300. In some embodiments, process 500 manages interactions between consumer 210, operating edge device 504, and content 414, generated by at least one publisher 212 using engagement client 502. In some embodiments, at block 506, process 500 manages cloud datacenter 208 implementations of a blockchain smart contract microservice 620. In some aspects, process 500 blockchain smart contract 508 implementations define engagement event 514 terms between consumer 210 and publisher 212 generally, as well as engagement event 514 terms between consumer 210 and content 414 selections. In some other aspects, a smart contract 508 formalizes and automatically enforces terms of an agreement between the parties regarding definitions and conditions of engagement events 514 on DAV network 200 and generates a smart contract 508 for use by process 500 to achieve transaction efficiency, accuracy and scale on programmatic networks. In still other aspects, smart contract 508 "terms" may include, but not be limited to, consumer 210 user data, publisher 212 profile information, content 414 subject matter and specifications, online platform type, location, time of day, device type, consumer identity graph and histogram, instructions 406 for resource requests 404 and responses 410, purchase history, platform engagement incentive, publisher engagement incentives, data privacy usage, user insight and behavioral data collection methods, engagement event related data usage rights, loyalty rewards, security and encryption protocols, cryptography keys, engagement compensation and/or negotiation parameters. In further aspects, publisher 212 may present engagement event 514 terms to one or more consumers 210 on DAV network 200 by distributing smart contract 508, representative of their respective engagement interests and requirements, via a microservice 620 using user edge device 504 and engagement client 502 software application controls. In still further aspects, consumer 210 may present engagement event 514 terms to one or more publisher 212 on DAV network 200 by distributing smart contract 508, representative of their respective engagement interests and requirements, via a microservice 620 using user edge device 504. In further aspects, where there is a proximate or relative match of smart contract 508 terms between the parties, and both include smart contract 508 negotiation parameters as a basis for establishing mutual agreement, the microservice 620 may provide each party with alternative conditions for engagements that are mutually agreeable. Assuming the alternatives are acceptable to both sides, smart contract 508 terms can be formalized and finalized in an efficient programmatic scheme managed in a virtual cloud environment. In some embodiments, at block 510, process 500 facilitates smart contract 508 transmissions in encrypted formats on secure VPN, as described previously, to various DAV network 200 components, including internet application 214. In some aspects, at block 510, gateway nodes, such as nodes 102-108, allow handshake authentication of smart contract 508 confirming terms of engagement for consumer 210 and publisher 212. In some aspects, gateway node is edge node 102-108 on a distributed secure VPN 112. In some other aspects, process 500 at block 510 may represent a microservice 620 cryptographic protocol for secure internet communications such as transport layer security (TLS) "handshakes" where two communicating sides exchange messages to acknowledge and verify one another and establish encryption algorithms to use as well as session keys. In still other aspects, block 510 may represent a Certificate Transparency (CT) or Electronic Transactions Development Agency (ETDA) blockchain based system implementation for enhanced TLS protocols. In some other embodiments, at block 510, process 500 includes software code components of internet application 214. In still other embodiments, at block 510, process 500 includes a node on a distributed virtual digital assets network 512. In some aspects, digital assets network 512 includes a blockchain system for generating digital assets. In some embodiments, digital assets managed facilitated by digital assets network 512 are comprised of electronic file types with the right to use including, but not limited to, documents, images, graphics, audio, videos, designs, spreadsheets, cryptocurrencies, blockchain tokens and non-fungible tokens. In some embodiments, at block 514, process 500 codifies an engagement event 514. In some aspects, engagement event 514 represents agreement on smart contract 508 terms of engagement, where consumer 210 interacts with publisher 212 and/or consumer 210 interacts with content 414 offered by publisher 212. In some other aspects, information and data is exchanged to fulfill each party's obligation per the smart contract 508 as described in FIGS. 2-4E. In still other aspects, information and data that comprise an engagement event 514 may be defined by a vast range of interactions or behaviors identified by DAV module 204 as well as DAV network 200 components. In further aspects, DAV network 200 user engagement defined as an engagement event 514 may be a single act, a group of related actions, a totality of actions to generate a predetermined outcome such as, but not limited to, web browsing, posting media or text messages, tagging favorites for purchase, filling a shopping cart, adding a "like" notification, a login sequence, completing a survey, providing biometric and physiological response data during a media exposure, and the like. In still further aspects, a completed engagement event 514 may be considered a "transaction," and create an engagement data 322 record for storage on user account 314 as well as related DAV network 200 components. In some embodiments, process 500 may create an electronic signature 320 record of engagement data 322 using cryptography application 330 and cryptographic key 122. In some embodiments, at block 516, according to engagement event 514 transaction outcomes, process 500 facilitates engagement activity records, authorization, and eligibility for engagement token and/or digital currency mining. In some aspects, a digital asset or token may be generated using microservice 620 in a value corresponding to engagement event 514 outcomes governed by smart contract 508 terms. In some embodiments, at block 518, process 500 enables a new engagement event 514 transaction to be confirmed and posted to a blockchain system, such as blockchain system nodes operating on a distributed virtual digital assets network 512 that generate digital assets. In some aspects, blockchain system miner nodes collect new transactions into a block and apply a verification process, such as proof of work or proof of stake, where miners compete to append or "mint" blocks. In some examples, a proof of work standard such as hashcash cryptographic algorithm hash function operates to validate the block on a blockchain transaction log. In further aspects, once a proof of work is found by a node, it broadcasts the block to all nodes, which accept the block only if all transactions in it are valid and not already spent, using the hash of the accepted block as the previous hash as acceptance of the block by working on creating the next block in the chain. In some embodiments, at block 520, process 500 enables digital asset rights to be confirmed using FIM 400 applications to verify and/or authenticate consumer 210, publisher 212 according to blockchained engagement event 514 transaction and electronic signature 320 data. In some embodiments, at block 522, DAV network 200 transactions may be confirmed and executed, including engagement event 514 transaction data and digital asset transfers between wallet 524 coupled to distributed virtual digital assets network 512, wallet 526 coupled to engagement client 502 (publisher 212), and wallet 528 coupled to edge device 504 (consumer 210).

FIG. 6. Illustrates a block diagram of an engagement intelligence marketplace exchange system 600. In some embodiments, system 600 generally facilitates transmissions of data, information and digital assets between with consumers 602, using edge client 604 and edge device 606, and publishers 608, using engagement client 610 and edge device 606, in addition to data, information and digital assets transfers between cloud datacenter 612, internet application 614 and microservice 620. In some other embodiments, system 600 is engagement software 140. In still other embodiments, system 600 is DAV module 204 operating on DAV network 200. In some embodiments, edge device 606 is edge device 302. In some embodiments, edge client 604 is DAV client 300. In some embodiments, engagement client 610 is DAV client 300. In some embodiments, cloud datacenter 612 is cloud datacenter 208. And, in some embodiments, internet application 614 is internet application 214. In some embodiments, consumers 602 and publisher 608 communicate with each other using edge device 606, directly using networked multifaceted smart device component 304 controls, and indirectly, using edge client 604 and engagement client 610 respectively, with smart contracts 508 that govern engagement event 514 transactions managed via gateway nodes by internet application 614 on a secure VPN 112, as detailed in FIG. 5.

Overall, in some aspects, consumer 602 offers human intelligence resources that are valued by publishers 608, each party participating in a transaction possessing motives that may vary according to the nature of the interaction, such as commercial advertisement, marketing, e-commerce, social, caregiving, personal wellness and the like. And, overall, human intelligence resources, now measurable as insights such as user attention, frustration, affinity, and confusion give new leverage to direct marketing and user insight acquisition strategies. Basic composition and presentation of engagement events 514 in online programmatic networks can be customized, and even individualized, according to predicable actions, interests, motives, and personalized choices which the present invention refines even further by increasing the depth and range of actionable and timely interaction and preference data, as exampled by the infinite possibilities of collectable information depicted in FIG. 3B using sensors 342, modalities 344, behaviors 346 and engagement factors 348. The value of these human intelligence resources as engagement influencers has a vast range where user motivation to acquire, identify or sell engagement event 514 information may change from one moment to the next. Embodiments of the present invention may be implemented to reduce engagement outcome uncertainty by creating an engagement data marketplace (EDM) 618 framework that unobtrusively learns online interaction patterns and preferences for sharing human intelligence resources that influence virtual and offline engagements decisions. In some aspects, EDM 618 creates several efficiency and disintermediation advantages for interested parties including, automated negotiation of engagement terms and conditions under which such information will be shared, creating a reliable method for offering and/or soliciting engagement intelligence on programmatic networks, and promoting secure transactions and data privacy with blockchain identity management techniques on virtual private networks. At its inception, the purpose of advertising was to timely deliver the proper message to customers and prospective customers. In the internet age, given the information overload and scarcity of cognitive capacity available for all of the possible online interactions accessible at a specific moment in time, the value of user "attention" and related engagement intelligence will continue to grow as demand for it spreads deeper across connected devices, platforms, channels and private interests.

In some embodiments, using edge client 604, consumers 602 may establish a user account 314, which may include DAV network 200 information regarding user experience preferences, such as engagement data 322. In some aspects, engagement data 322 may include user interaction preferences designated by an electronic filter menu 710, to broadly or narrowly define the nature and composition of customized interactions, in some aspects on a case-by-case basis, between consumers 602, publishers 608 or consumers 602 and content 414 distributed by publishers 608. In other aspects, engagement data 322 information may contain personal demographics, online platform activity data, virtual social connections, and content 414 consumption preferences such as, but not limited to, subject matter, sources, publishers, day of the week, time of day, frequency of interaction, and behavioral insights. In still other aspects, edge client 604 may enable consumers 602 to control access to and/or visibility of their user account 314 information by other system 600 users of edge device 606 by using filter menu 710 that enable and disable access to specific data types, categories and subcategories, as detailed in FIG. 7. In further aspects, consumers 602 may use filter menu 710 to create and manage engagement terms and conditions for sharing, trading or selling their engagement data 322 "intelligence" on EDM 618. In some examples, engagement data 322 intelligence may refer to user behavioral data derived from platform or device level records regarding user interaction preferences, habits, conditions, history and the like. In still further aspects, filter menu 710 enables consumers 602 to define smart contracts 508 parameters in programmatic exchanges such as EDM 618 to manage, govern, negotiate, define and enforce engagement terms and engagement condition attributes. In one example, consumers 602 may use filter menu 710 settings to selectively choose who, when, where and how much user data 314 is disclosed to publishers 608 associated with a specific transaction or category of transactions. In some instances, filter menu 710 settings may include restrictions on the manner of use such that, in some cases, only a select few publishers 608 solicitations for engagement events 514 would be visible to consumers 602 on EDM 618, which is exemplary of the innovations described herein. In the present example, a multi-version smart contract 508 strategy on programmatic networks from publishers 608 may include alternates to an initial set of terms for engagement intelligence exchanged where, based on the filter menu 710 transparency (factors that influence the value of specific consumer's engagement intelligence and content feedback), smart contract 508 options may include a final version that accepts all of a consumers 602 engagement terms and conditions. On the other side, in some aspects, publishers 608, seeking broad or targeted engagement intelligence from a wide consumer 602 audience, may use engagement client 610 and filter menu 710 to define distribution for advertising, incentives, compensation and other enticements, in order to motivate and encourage consumers 602 acceptance of engagement solicitations. In other aspects, publishers 608 may use engagement client 610 and filter menu 710 settings to establish user account 314 preferences and parameters for online engagements, including smart contract 508 governed prerequisites for consumers 602 eligibility or qualifications to receive publishers 608 engagement solicitations on EDM 618.

In some aspects of the present invention, EDM 618 presents a safe and secure virtual exchange environment for sellers of engagement intelligence (consumers 602) and buyers of engagement intelligence (publishers 608). In other aspects, EDM 618 user identities are authenticated with blockchain confidence, private data is stored only on edge devices, user profile data is encrypted, and all transmission are managed within a distributed VPN to edge devices using a cryptographic key. In some other aspects, the certainty of both participants identity elevates trust and confidence in the engagement intelligence transaction, as well as reliance on EDM 618 to efficiently screen engagement opportunities with the convenience of smart contract 508 in an automated system, with processes that determine matches between parties based on their prequalified consent to share mutual engagement interests. In still other aspects, with a critical mass of participants, EDM 618 generates market dynamics for supply, demand, and pricing elasticity for engagement intelligence data in a global economy for user attention, behavioral insights, user interactions, and consumption data. In further aspects, EDM 618 establishes new marketing tools for publisher 608 with a virtual environment for modeling engagement event 514 outcomes, where data profile filter menu 710 can establish conceptual frameworks that can be efficiently tested and vetted with a small, large focus group, select demographics, and/or live audiences.

Generally, system 600 implements a number of microservice 620 embodiments in a distributed cloud-based network architecture, such as edge network 100. In some embodiments, microservice 620 provides identity management, data security management, and engagement intelligence services via secure hybrid cloud deployed applications on edge device 606, cloud datacenter 612, internet application 614 and EDM 618. In other embodiments, hybrid cloud deployments include a combination of a public cloud and private cloud to protect and secure data and applications in the cloud, on virtual private network channels and edge devices. In some embodiments, microservice 620 embodiments are implemented in a multi-tenant cloud architecture wherein software and/or server resources are shared by users while maintaining data isolation and privacy. In some embodiments, microservice 620 is implemented in a stateless middle tier environment to improve system monitoring, reliability and scalability. In some embodiments, microservice 620 architectures supports multi-channel access via web, mobile and application programming interfaces ("APIs"). In some aspects, microservice 620 architectures enables separation of tasks on system 600 to improve software deployment with lightweight, technology-agnostic protocols on distributed systems that afford greater customization, modularity and design changes. In some embodiments, microservice 620 architecture is a collection of services that are operable independently and/or collectively with standardized protocols for universal communications between self-contained modules.

In some embodiments, microservice 620 architectures refers to a service-oriented architecture (SOA) that executes operations, functions and communications through a functional interface, such as an application program interface service (API) or API platform 622. In some embodiments, API 622 represents a collection of capabilities as services where each microservice 620 may operate independently or collectively on one or more distributed nodes to perform various tasks, where an API 622 may be used to "call" one or more services into an active operation mode. In some aspects, API 622 operates on a distributed node network, such as edge network 100 and DAV network 200. In other aspects, API 622 may operate and allow consumers 602 and publishers 608 access to one or more microservice 620 embodiments on a physical computing entity, such as edge device 606, as well as virtual computing entities, such as engagement client 610, cloud datacenter 612 and internet applications 614. In some aspects, API 622 is configured for web application, hybrid-web application, and native application access to system 600 hardware and software applications such as, but not limited to, at least one communication layer, business rules layer, security layer, data science layer, cryptography layer, VPN layer, data processing layer, data management layer, and data storage layer.

In some embodiments, microservice 620 architecture includes an identity service 624 for managing user accounts on system 600. In some embodiments, identity service 624 executes software for consumers 602 and publishers 608 to create and maintain user account 314 data and related user account information for system 600 access and operations. In some aspects, user account 314 information may include, but not be limited to, legal name, account user name, contact information, device information, corporate information, marketing information, IP address, biometric 316 data, non-biometric 318 information, payment information, cryptographic data, EDM 618 activity data and the like. In some embodiments, identity service 624 executes user processes for data onboarding, identity validation and verification, including CAPTCHA programs, as detailed in FIGS. 3A-E.

In some embodiments, microservice 620 architecture includes a security service 626. In some aspects, security service 626 executes software for maintaining security protocols on distributed network nodes and components of system 600. In other aspects, security service 626 maintains smart contract 508 generation and transactions between system 600 users according to processes detailed in FIG. 5. In some other aspects, security service 626 maintains user account 314 access operations including, but not limited to, user account login sequence, edge device 606 access permissions to system 600 data and components, identity service 624 validation and verification processes, token service 632 permissions, consumers 602 and publishers 608 authorization permissions for data usage and access to system 600 data and components.

In some embodiments, microservice 620 architecture includes a filter service 628. In some aspects, filter service 628 executes software for user management of identity and security information, EDM 618 data, filter menu 710 data, data sharing authorization, usage rights, and permission-based access to private user data. In some aspects, filter service 628 enables consumers 602 and publishers 608 to select, parse, customize user account 314 information that is accessible by system 600. In some aspects, filter service 628, coupled to filter menu 710, enables consumers 602 and publishers 608 to select, parse, and customize visibility of their data to other system 600 users, on an authorization or permission basis, including applications that block, limit, or require permission-based approval for information sharing and accepting information and/or data from other system 600 users.

In some embodiments, microservice 620 architecture includes an engagement service 630. In some aspects, engagement service 630 executes software for user management of engagements on system 600 including, but not limited to, user profile information, user activity data, behavioral analytics, transactional analytics, and the like. In some embodiments, engagement service 630 deploys data science modules, such as machine learning and artificial intelligence applications, that collect, analyze and evaluate user data in order to determine comparisons, correlations, compatibilities and predictive data insights between consumers 602 and publishers 608 on system 600 based user activity including, but not limited to, engagement events 514, transactions 522, identity service 624 and filter service 628 information. In some embodiments, engagement service 630 executes a matching process according to identity service 624 and filter service 628 whereby system 600 users may identify and be identified by other users with similar engagement event 514 interests, according to filter menu 710 settings. In some aspects, engagement service 630 may determine and set the conditions and parameters by which smart contracts 508 on a programmatic platform can automatically negotiate terms between system 600 users regarding engagement interests, accepting solicitations for engagement events 514, accepting terms for engagement event 514 participation, and the like. In some aspects, engagement service 630 may generate and distribute solicitations for engagement events 514 to user audiences based on identity service 624 and filter service 628 settings of a prospective audience member, which may be comprised of a group of consumers 602, a group of publishers 608, or a mix of both. In some aspects, engagement service 630 may manage engagement event 514 campaigns where publishers 608 can collect consumers 602 engagement intelligence in real-time with data ingested in cloud datacenter 612 computer processes for analysis, comparisons, predictions and recommendations.

In some embodiments, microservice 620 architecture includes a token service 632. In some embodiments, token service 632 executes software for user management of digital assets on system 600. In some embodiments, token service 632 manages connections, security protocols, and communications between nodes on a distributed digital asset network 512. In some aspects, token service 632 maintains a distributed ledger and API 622 ledger functions for networked wallet 524, engagement client wallet 526 and edge device wallet 528 including, but not limited to, processors and computer code for creating transactions, validating transactions, and determining the number of block configurations for a transaction.

In some embodiments, microservice 620 architecture includes a dashboard service 634. In some embodiments, dashboard service 634 executes software as a service or platform as a service application for consumers 602 and publishers 608 to manage engagement event 514 activity, data, and information sharing. In some aspects, dashboard service 634 provides system 600 users with software features, objects, applications, modules and other executable code to support analytics, visualizations, graphics, and related engagement data metrics including, but not limited to, sensors 342, modalities 344, behaviors 346 and engagement factors 348 detailed in FIG. 3D. In other aspects, dashboard service 634 may be coupled to engagement service 630 to configure consumers 602 engagement event 514 campaigns customized to solicit and acquire consumers 602 engagement intelligence responses to both a solicitation and presentation of content 414, on a standalone basis per a single consumer 602 or presentation to a group of consumers 602. In some other aspects, on an ad-hoc basis, dashboard service 634 may use filter menu 710 to create audience groups for engagement event 514 solicitations by identifying group attributes of consumers 602 such as, but not limited to, personal demographics (age, sex race), location, time of day, day of the week, brand affinity/loyalty, device, histograms, universal or persistent ID, content 414 consumption history, and content 414 behavioral response data such as depicted in FIG. 3 and FIG. 4. In still other aspects, dashboard service 634 may be used to generate reports 822 detailing system 600 performance and engagement event 514 activity such as, but not limited to, key performance indicators, strategic data metrics, enterprise level processes, activity monitoring, business processes, and data usage information generated by all system components and users 602, 604, 606, 608, 610, 612, 614, 618, and 620.

Figure 7A:
FIG. 7A is screen shot illustration a of an exemplary user interface screen for accessing an engagement intelligence marketplace exchange.

FIG. 7A illustrates a screen shot 700 of an exemplary interface screen for accessing an engagement intelligence marketplace exchange, as may be shown to a user according to one or more disclosed embodiments. In some embodiments, screen shot 700 may represent a native application page 702 for consumers 602 engagement intelligence and various microservice 620 settings. In some aspects, native application navigating user input fields for consumers 602 engagement intelligence data and related microservice 620 information. In the present example, consumers 602 may establish engagement intelligence criteria for interacting with publishers 608 according to native application page 702 navigation menu categories including, but not limited to, brands, platforms, product or service categories, product name or type, company profile information and/or available engagement event 514 solicitations that match consumer 602 smart contract requirements.

Figure 7B:
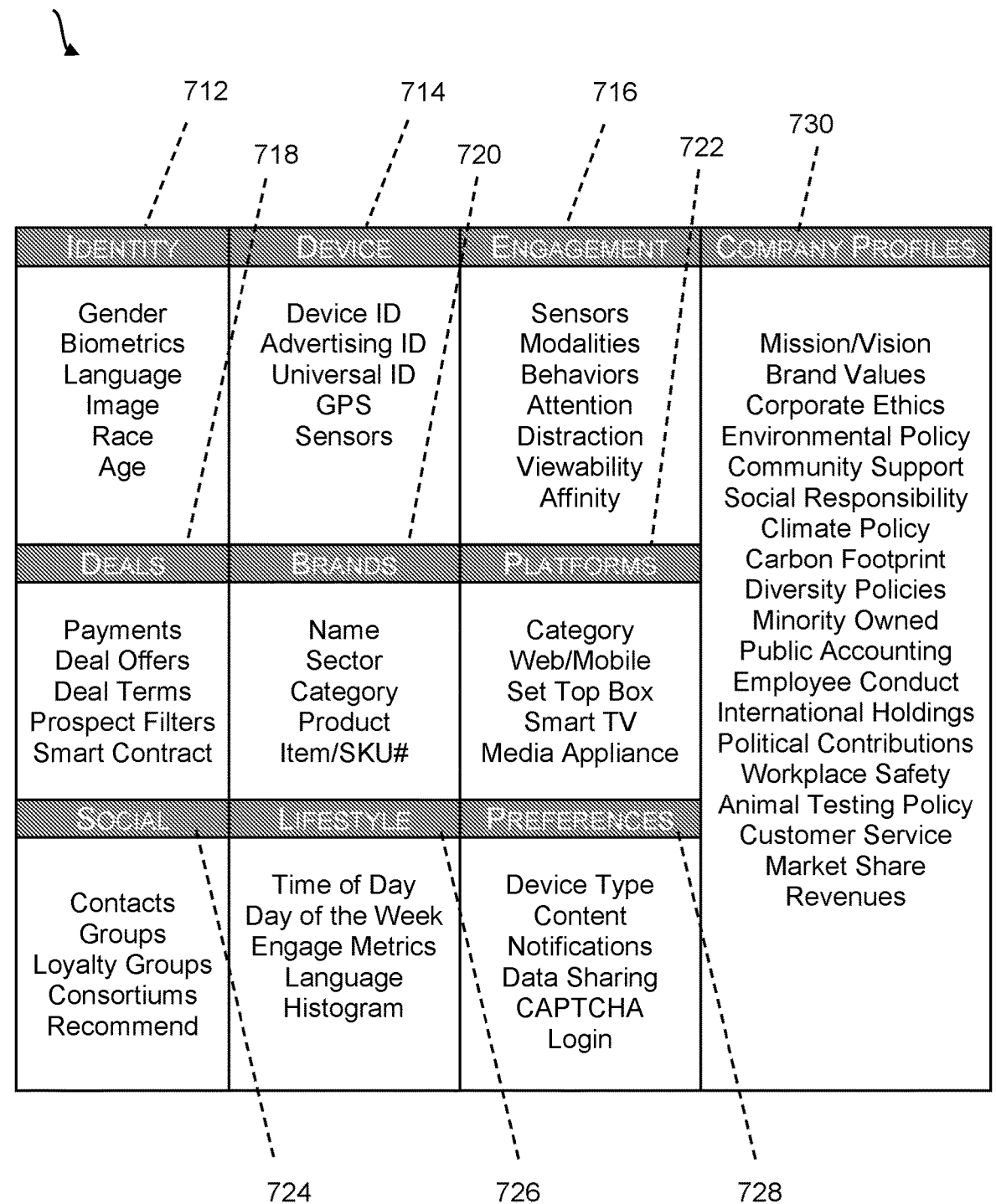
FIG. 7B illustrates exemplary engagement intelligence filter menu.

FIG. 7B illustrates an exemplary engagement intelligence filter menu 710 for use on system 600. In some embodiments, filter menu 710 represents data and information created and generated by consumers 602 input on edge client 604 operating on edge device 606. In other embodiments, filter menu 710 data is information associated with user account 314 functions, access and usage described in previous disclosures of innovations herein. In some other embodiments, filter menu 710 data and information is engagement data 322. In still other embodiments, filter menu 710 represents data and information created and generated by publishers 608 input via engagement client 610 operating on edge device 606. In further embodiments, filter menu 710 represents information created and generated by system 600 and for use by the system as well as related hardware and software components. In still further embodiments, filter menu 710 may provide various engagement intelligence filter menu categories and sub-categories, including but not limited to those depicted in FIG. 7B.

In some embodiments, filter menu 710 includes identity information 712 menu category and related subcategories including, but not limited to, those depicted in FIG. 7B. In some aspects, identity information 712 may include consumer 602 and publisher 608 personal, professional, and demographic information such as, name, address, phone, email, device ID, title, job description, credentials, age, gender, race, language, photo, and biometric data.

In some embodiments, filter menu 710 may include device information 714 menu category and related subcategories including, but not limited to those depicted in FIG. 7B. In some embodiments, device information 714 is generated from components 304 and sensors 342 operating on edge device 606. In some aspects, device information 714 originating from components 304 and sensors 342 may include hardware and software functions such as, but not limited to, GPS location sensor, image and video cameras, accelerometer, gyroscope, electronic device identifier, advertising identifier or IDFA, universal identifier or persistent ID, web browsing data or histogram, and the like. In some embodiments, device information 714 is generated from edge client 604 and engagement client 610 user input operating on edge device 606. In some aspects, device information 714 may be generated by data input from consumers 602 and publishers 608 before, during and after user interactions on system 600 and initiation of an engagement event 514. In other aspects, device information 714 may be generated by edge client 604, engagement client 610 and/or internet application 614 as result of, or in anticipation of, user interactions on system 600. In some other aspects, device information 714 may be created and generated by system 600 level automated applications and process, such as microservices 620 and cloud datacenter 612 programs.

In some embodiments, filter menu 710 includes engagement information 716 menu category and related subcategories including, but not limited to, those depicted in FIG. 7B. In some aspects, engagement information 716 is comprised of data created and generated by system 600 users according to hardware, software implemented applications and operations described in the previous disclosures including, but not limited to, sensors 342, modalities 344, behaviors 346 and engagement factors 348.

In some embodiments, filter menu 710 includes deal information 718 menu category and related subcategories including, but not limited to, those depicted in FIG. 7B. In some aspects, deal information 718 is comprised of EDM 618 related activity, customized user information, and network activity data related to engagement event 514 solicitations, engagement data 322 valuations, and engagement intelligence compensation opportunities from publishers 608 to consumers 602. In some embodiments, deal information 718 is smart contract 508 generated by publishers 608 operating engagement client 610 on edge device 606. In other embodiments, deal information 718 is smart contract 508 generated by consumers 602 operating edge device 606. In some aspects, deal information 718, coupled to filter service 628 and filter menu 710, provides consumers 602 and publishers 608 the means to establish unlimited smart contract 508 versions that represent each parties engagement interests on programmatic networks. This scheme for automated bargaining of interaction terms creates matchmaking efficiencies in time and cost that far exceed traditional methods of identifying engagement prospects and marketing insights. In some aspects, engagement intelligence data value may be first determined by publishers 608 decisions in creating filter menu 710 profile parameters of targeted consumers 602 or groups of consumers 602. In other aspects, engagement intelligence data value may be first determined by consumers 602 decisions in creating filter menu 710 profile parameters accessible by publishers 608 or affinity focused groups of consumers 602. In some embodiments, deal information 718 may be coupled to engagement service 628 to generate provide historical data from EDM 618 activity based on the proposed smart contract 508 profile parameters, generated by publishers 608 and consumers 602, that indicate the type, nature and amount of compensation or incentive provided as an indicator of participation and/or conversion rates for a particular audience. In some aspects, deal information 718 is coupled to engagement service 628 to generate provide historical data regarding specific information, data and/or behaviors to be exchanged for an offer of a specific virtual or real-world premium, loyalty reward points compensation, virtual or hard currency, digital assets, and the like.

In some embodiments, filter menu 710 includes brand information 720 menu category and related subcategories including, but not limited to, those depicted in FIG. 7B. In some aspects, brand information 720 is generated by publishers 608 operating engagement client 610 on edge device 606. In some aspects, brand information 720 may be coupled to company information 730, to generate historical data from EDM 618 activity such as product detail, features, benefits, development, use cases, or warnings.

In some embodiments, menu 710 includes platform information 722 menu category and related subcategories including, but not limited to, those depicted in FIG. 7B. In some aspects, platform information 722 is generated by publishers 608 operating engagement client 610 and/or internet application 614. In some embodiments, platform information 722 provides software and hardware instructions to edge client 604, engagement client 610, and edge device 606 such that they adjust, change or limit software and hardware operations, functions, and network protocols according to technical requirements and performance limitations of the device operating system 600.

In some embodiments, filter menu 710 includes social information 724 menu category and related subcategories including, but not limited to, those depicted in FIG. 7B. In some aspects, social information 724 is generated by consumers 602 and publishers 608 for use on system 600. In some aspects, social information 724 determines general or specific filter menu 710 data or information that is availability, shared or accessible by system 600 users.

In some embodiments, filter menu 710 includes engagement lifestyle information 726 menu category and related subcategories including, but not limited to, those depicted in FIG. 7B. In some aspects, lifestyle information 726 is generated by consumers 602 for use by the data originator, designated system 600 components and applications, and may be accessible to other users of system 600 on a permission basis. In other aspects, lifestyle information 726 is coupled to engagement service 628 to generate provide historical data regarding user activity, behaviors, preferences, and engagement metrics to guide, instruct and present reference data as indicators of behavioral trends, interaction preferences, user productivity in virtual settings, qualitative and quantitative metrics that parse engagement data 322 and interpret engagement intelligence for system 600 users.

In some aspects, filter menu 710 includes user preference information 728 menu category and related subcategories including, but not limited to, those depicted in FIG. 7B. In some aspects, user preference information 728 is generated by consumers 602 and publishers 608 for use by system 600, and may be accessible to other users of system 600 on a permission basis. In other aspects, user preference information 728 may determine data and information available on system 600, as well as terms for accessibility and usage, including information and data generated by edge client 604, edge device 606, engagement client 610, and various system 600 software and hardware settings and components.

In some aspects, filter menu 710 includes company information 730 menu category and related subcategories including, but not limited to, those depicted in FIG. 7B. In some aspects, company information 730 is generated by publishers 608 for use by system 600, and may be accessible to other users of system 600 on a permission basis. In other aspects, company information 730 may include various categories and subcategories of business profile information that may be incorporated in smart contract 508 solicitations for engagement intelligence on EDM 618. In some examples, specific types, mission statements, disclaimers, and other representations categories of company information 730 may be prerequisites coded into consumers 602 smart contract 508 solicitation responses, according to their desire for greater transparency and/or bargaining position with prospective publishers 608.

FIG. 8A illustrates a screen shot 800 of an exemplary dashboard overview of software used to manage data and information associated with an engagement intelligence marketplace exchange, including an engagement analytics screen 802 according to one or more disclosed embodiments of system 600. In some embodiments, engagement analytics screen 802 represents a visual embodiment of engagement client 610. In other embodiments, engagement analytics screen 802 represents a visual embodiment of DAV module 204. In some other embodiments, engagement analytics screen 802 represents visual embodiments of microservices 620. In some aspects, engagement analytics screen 802 represents examples of applications, services and components comprising engagement analytics system 600, but such depictions are not intended to limit the scope of innovations described in the present invention herein.

In some embodiments, engagement analytics screen 802 represents data and information created and generated by engagement analytics system 600 hardware, software and users. In some aspects, engagement analytics screen 802 provides a system view of engagement analytics system 600. In some embodiments, system 600 includes a data ingestion layer 804. In some aspects, data ingestion layer 804 may be comprised of or one more models for data pipelines for transporting data on system 600. In some examples, data ingestion layer 804 architectures may include batch processing, stream or real-time processing and or micro batching. In some embodiments, system 600 includes a data integration layer 806. In some aspects, data integration layer 806 may be comprised of or one more processes for consolidating data from various system 600 components. In some examples, data integration layer 806 may include one or more techniques such as, but not limited to, extract, transform, load, data replication, change data capture, data virtualization and/or streaming data integration. In some embodiments, system 600 includes a data storage layer 808. In some aspects, data storage layer 808 may be comprised of or one more data file systems for storing data from various system 600 components. In some examples, data storage layer 808 may include one or more system types such as, but not limited to, hard disk, cloud server and or distributed file systems. In some embodiments, system 600 includes a data security layer 810. In some aspects, data security layer 810 may be comprised of software and hardware components configured to protect system 600 including data, applications, user access, and network architectures. In some examples, data security layer 810 may include models and frameworks that manage data storage, device access endpoints, user authorization, perimeter security and human layer security controls. In some embodiments, system 600 includes a data cryptography layer 812. In some aspects, data cryptography layer 812 may execute encoding and decoding processes for converting data into an unreadable format, in some examples the process includes a symmetric or asymmetric digital key 122 that allows a recipient of unreadable data to convert it to a readable format. In some aspects, data cryptography layer 812 may include application models and frameworks, such as hashes and digital certificates, that deploy algorithms that convert data into unreadable formats in various levels such as, but not limited to, Triple data encryption algorithm (DES), advanced encryption standard (AES), Rivest-Shamir-Adelman (RSA), Blowfish, Twofish, and FPE. In some embodiments, system 600 includes a data processing layer 814. In some aspects, data processing layer 814 may be comprised of software configured to select, analyze and format data elements. In some examples, data processing layer 814 may include models and frameworks such as Apache PIG, MapReduce or HIVE. In some embodiments, system 600 includes a data science layer 816. In some aspects, data science layer 816 may be comprised of software implemented neural network software applications with input, output and hidden layers of processing nodes including weight and bias values that enable a program to develop output from ingestion layer 804 information and without programmed rules. In other aspects, data science layer 816 may include models and frameworks that classify and cluster raw, unlabeled, real-world data. In some embodiments, system 600 includes a data reporting layer 818. In some aspects, data reporting layer 818 may be comprised of software configured to create data flows and formats for system 600 data modeling, transformation and visualization. In some aspects, data reporting layer 818 may include models, processes and applications for viewing, reporting and analyzing system 600 data.

FIG. 8B illustrates a screen shot 800 of an exemplary dashboard overview of an engagement campaign builder screen 820 according to one or more disclosed embodiments of system 600. In some embodiments, engagement campaign builder screen 820 represents a process, implementation and/or embodiment of engagement client 610. In some aspects, engagement campaign builder screen 820 represents a computer implemented method for publishers 608 to create parameters for engagement events 514 and engagement intelligence solicitations managed by smart contracts 508 distributed to consumers 602 on system 600, according to various embodiments of the invention described previously. In some aspects, engagement campaign builder screen 820 parameters include information relevant to EDM 618 transactions and exchanges between consumers 602 and publishers 608 such as, but not limited to, engagement event 514 subject matter, content type and description, description of desired engagement intelligence, audience mix, audience reach, budget calculation, and campaign deployment methods, elements and filters. FIG. 8C illustrates a screen shot 800 of an exemplary dashboard overview of an engagement campaign reporting screen 822 according to one or more disclosed embodiments of system 600. In some embodiments, engagement campaign reporting screen 820 is coupled to data reporting layer 818. In some aspects, engagement campaign reporting screen 820 represents a method for engagement client 610 to collect, organize, sort and present various aspects of system 600 operations including, but not limited to, EDM 618 activity, smart contract 508 solicitations, engagement events 514 and transactions 522 in various electronic forms for system 600 components, as well as business intelligence and/or data science formats for presentation to system 600 users as shown in FIG. 8A.

The foregoing descriptions of specific aspects of the present inventions have been presented for purposes of illustration and description. The images, drawings, schematics and etc. are not meant to be exhaustive or to limit the invention to the precise forms or scope disclosed, and many modifications and variations are possible in light of the above teaching to an individual skilled in the relevant art. Therefore, the descriptions herein are included to illustrate the operation of preferred aspects and are not meant to limit the scope of the invention, but rather they are intended to explain the principles of the invention, utility of the innovation in specific use cases, and practical applications for various aspects. Based on the present teachings, others skilled in the art would be capable of incorporating many minor modifications that are anticipated within this disclosure. It is intended that the scope of the invention be defined by the claims appended hereto and their equivalents. Therefore, the scope of the invention is to be broadly limited only by the following claims.

What is claimed is:

1. A computer implemented method, comprising:

using at least one processor of an identity management and behavioral insight verification system to perform a process, the process comprising:

integrating an identity validation and behavioral insight verification system with an engagement intelligence marketplace exchange in an edge computing environment for access by a plurality of mobile edge nodes, the engagement intelligence marketplace exchange located on edge computing layers for access by the edge nodes;

permitting blockchain key encrypted access to edge nodes of an identity validation and behavioral insight verification system for two user groups, a virtual buyer group of content publishers offering compensation in exchange for engagement event behavior insights, and a virtual seller group of content consumers interested in earning compensation in exchange for providing engagement event behavior insights to content;

identifying off-device measurable physiological information to identify a specific human with unique biometric features and attributes and verify biometric engagement intelligence insights associated with user engagement events;

encrypting techniques for smart contracts for negotiations and transactions by users on an engagement intelligence marketplace exchange, encrypted engagement event insight intelligence data transfers, and mining digital assets according insight intelligence value;

recommending techniques for consumer and publisher users, user groups and engagement intelligence marketplace exchange opportunities with preference filters for matching consumer and publisher engagement interest on programmatic content distribution networks;

associating engagement intelligence data with recommendation on a programmatic multimedia content distribution system based on smart contract information representing user interests on a behavioral data exchange marketplace;

facilitating a plurality of behavioral data engagement intelligence marketplace exchange transactions via a secure distributed node network from a plurality of users, transactions comprising smart contracts with immutable data for automated negotiation processes, network comprising blockchain encryption and real-time bidding processes; and authenticating the identity of a human subject with capture of off-device biometric verification data, before, during and after collecting engagement event intelligence data associated with the human subject.

* * * * *